United States Patent
Tsuchizawa

(10) Patent No.: US 10,035,559 B2
(45) Date of Patent: Jul. 31, 2018

(54) BICYCLE CONTROL APPARATUS AND BICYCLE ASSIST DEVICE EQUIPPED WITH THE CONTROL APPARATUS

(71) Applicant: Shimano Inc., Sakai, Osaka (JP)

(72) Inventor: Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 97 days.

(21) Appl. No.: 15/204,330

(22) Filed: Jul. 7, 2016

(65) Prior Publication Data

US 2017/0021896 A1    Jan. 26, 2017

(30) Foreign Application Priority Data

Jul. 21, 2015 (JP) ................................. 2015-144426

(51) Int. Cl.
 *B62M 6/50* (2010.01)
 *B62M 6/55* (2010.01)
 *B62M 6/45* (2010.01)

(52) U.S. Cl.
 CPC ............... *B62M 6/50* (2013.01); *B62M 6/45* (2013.01); *B62M 6/55* (2013.01)

(58) Field of Classification Search
 CPC ............. B62M 6/50; B62M 6/55; B62M 6/45
 USPC .......................................................... 701/22
 See application file for complete search history.

(56) References Cited

U.S. PATENT DOCUMENTS

| | | | | |
|---|---|---|---|---|
| 5,806,621 A * | 9/1998 | Soda | ................... | B60L 11/1801 180/206.2 |
| 5,878,831 A * | 3/1999 | Saito | ................... | B60L 11/1801 180/206.2 |
| 6,213,236 B1 * | 4/2001 | Yokoyama | ............... | B62M 6/10 180/205.3 |
| 6,247,548 B1 * | 6/2001 | Hayashi | ............. | B60L 11/1801 180/206.2 |
| 6,320,336 B1 * | 11/2001 | Eguchi | ..................... | B62M 6/45 180/206.2 |
| 7,706,935 B2 * | 4/2010 | Dube | ....................... | B62M 6/45 180/169 |
| 8,892,279 B2 * | 11/2014 | Aoki | ..................... | B62M 3/003 701/22 |
| 9,751,589 B2 * | 9/2017 | Tsuchizawa | ............ | B62M 6/45 |
| 2012/0083957 A1 * | 4/2012 | Aoki | ..................... | B62M 3/003 701/22 |

(Continued)

FOREIGN PATENT DOCUMENTS

| | | |
|---|---|---|
| JP | 2007-230411 A | 9/2007 |
| JP | 2012-121338 A | 6/2012 |
| JP | 5575968 B1 | 8/2014 |

*Primary Examiner* — Jaime Figueroa

(74) *Attorney, Agent, or Firm* — Global IP Counselors, LLP

(57) ABSTRACT

A bicycle control apparatus is provided that permits a determination of a rotating body to be detected of a sensor that outputs a signal that reflects the rotational speed of a rotating body, and a bicycle assist device equipped with this control apparatus. The bicycle control apparatus includes a controller that, based on an output of a first sensor for outputting a signal that reflects a rotational speed of a rotating body provided to a bicycle, and an output of a second sensor for outputting a signal that reflects a rotational speed of a rotating body provided to the bicycle, determines whether or not the detection target of the first sensor and the detection target of the second sensor are the same rotating body.

16 Claims, 22 Drawing Sheets

(56) References Cited

U.S. PATENT DOCUMENTS

| | | | | |
|---|---|---|---|---|
| 2012/0241264 A1* | 9/2012 | Hosaka | ................. | B60L 7/14 |
| | | | | 188/156 |
| 2015/0120119 A1* | 4/2015 | Tauchi | ................. | B62M 6/55 |
| | | | | 701/22 |
| 2015/0120240 A1* | 4/2015 | Fujita | ................. | G01C 9/00 |
| | | | | 702/154 |
| 2015/0136508 A1* | 5/2015 | Strothmann | ............ | B62M 6/45 |
| | | | | 180/206.3 |
| 2015/0136509 A1* | 5/2015 | Tanaka | ................. | B62M 6/50 |
| | | | | 180/206.3 |
| 2015/0158550 A1* | 6/2015 | Kawakami | ............... | B62M 6/55 |
| | | | | 180/206.2 |
| 2016/0297499 A1* | 10/2016 | Ohashi | ................. | B62M 6/45 |
| 2016/0318575 A1* | 11/2016 | Shimoda | ................ | B62L 3/023 |
| 2016/0347411 A1* | 12/2016 | Yamamoto | ............... | B62M 6/45 |
| 2016/0375955 A1* | 12/2016 | Negoro | ................. | B62M 1/36 |
| | | | | 701/22 |
| 2017/0001687 A1* | 1/2017 | Usui | ................. | B62M 6/55 |

\* cited by examiner

BICYCLE CONTROL APPARATUS AND BICYCLE ASSIST DEVICE EQUIPPED WITH THE CONTROL APPARATUS

CROSS-REFERENCE TO RELATED APPLICATIONS

This application claims priority to Japanese Patent Application No. 2015-144426, filed on Jul. 21, 2015. The entire disclosure of Japanese Patent Application No. 2015-144426 is hereby incorporated herein by reference.

BACKGROUND

Field of the Invention

The present invention generally relates to a bicycle control apparatus and a bicycle assist device equipped with this control apparatus.

Background Information

Conventionally, a bicycle control apparatus for controlling the assist motor based on a rotational speed of a rotating body provided to a bicycle is known. For example, a bicycle control apparatus is disclosed in Japanese Laid-Open Patent Publication No. 2007-230411 that controls an assist motor using an output of a bicycle speed sensor that detects the rotational speed of a wheel.

SUMMARY

Generally, the present disclosure is directed to various features of a bicycle control apparatus and a bicycle assist device equipped with the bicycle control apparatus.

In a bicycle control apparatus configured to control the assist motor based on the rotational speed of a wheel, there is the risk that the control apparatus cannot execute an appropriate control, when a conversion has been made to detect the rotational speed of the crank by a bicycle speed sensor. While a bicycle control apparatus for controlling the assist motor was described, the same problem could occur in any control apparatus that controls a bicycle component based on the rotational speed of a rotating body.

One object of the present invention is to provide a bicycle control apparatus that permits a determination of a rotating body to be detected by a sensor that outputs a signal that reflects the rotational speed of a rotating body, and a bicycle assist device equipped with this control apparatus.

In view of the state of the known technology and in accordance with a first aspect of the present disclosure, a bicycle control apparatus according to one embodiment of the present invention comprises a controller configured to determine whether or not a detection target of a first sensor and a detection target of a second sensor are the same rotating body based on an output of a first sensor that reflects a rotational speed of a rotating body provided to a bicycle and an output of a second sensor that reflects a rotational speed of a rotating body provided to the bicycle.

According to one embodiment of the bicycle control apparatus, the controller is configured to permit a driving of an assist motor that provides a manual drive force to the bicycle upon determining the rotational speed of the rotating body being detected by the first sensor is less than a first speed. The controller is configured to stop the driving of the assist motor when the rotational speed of the rotating body being detected by the first sensor is greater than or equal to the first speed. The controller is configured to control the assist motor based on a detection result on whether or not the detection target of the first sensor and the detection target of the second sensor are the same rotating body.

According to one embodiment of the bicycle control apparatus, the controller is configured to prohibit the driving of the assist motor, when the first sensor and the second sensor are determined to be detecting a state of the same rotating body.

According to one embodiment of the bicycle control apparatus, the controller is configured to determine whether or not the detection target of the first sensor and the detection target of the second sensor are the same rotating body, based on at least one of a phase difference between a phase of a signal that is outputted by the first sensor and a phase of a signal that is outputted by the second sensor, and a period difference between a period of a signal that is outputted by the first sensor and a period of a signal that is outputted by the second sensor.

According to one embodiment of the bicycle control apparatus, the controller is configured to determine that the detection target of the first sensor and the detection target of the second sensor are the same rotating body, when a number of times that the phase difference or the period difference becomes within a first prescribed range becomes greater than or equal to a first prescribed number of times.

According to one embodiment of the bicycle control apparatus, the controller is configured to determine whether or not the detection target of the first sensor and the detection target of the second sensor are the same rotating body, based on a speed difference between a change in speed of the rotating body that is being detected by the first sensor when the rotational speed of the rotating body that is being detected by the first sensor is decreasing, and a change in speed of the rotating body that is being detected by the second sensor when the rotational speed of the rotating body that is being detected by the second sensor is decreasing.

According to one embodiment of the bicycle control apparatus, the controller is configured to determine that the detection target of the first sensor and the detection target of the second sensor are the same rotating body, when a number of times that the speed difference becomes within a second prescribed range becomes greater than or equal to a second prescribed number of times.

According to one embodiment of the bicycle control apparatus, the controller is configured to determine whether or not the detection target of the first sensor and the detection target of the second sensor are the same rotating body, based on the output of the first sensor and the output of the second sensor, when a driving force of a rider is smaller than a prescribed value.

According to one embodiment of the bicycle control apparatus, the controller is configured to determine whether or not the detection target of the first sensor and the detection target of the second sensor are the same rotating body, based on the output of the first sensor and the output of the second sensor, when a gear ratio of the bicycle is other than "1."

According to one embodiment of the bicycle control apparatus, the controller is configured to prohibit the driving of the assist motor, when the first sensor and the second sensor are determined to be detecting a state of the same rotating body, and when the driving of the assist motor is being prohibited based on a determination that the detection target of the first sensor and the detection target of the second sensor are the same rotating body, the controller is configured to permit the driving of the assist motor when the detection targets of the first and second sensors are determined not to be the same rotating body, based on the outputs of the first and second sensors.

According to one embodiment of the bicycle control apparatus, when the driving of the assist motor is being prohibited based on a determination that the detection target of the first sensor and the detection target of the second sensor are the same rotating body, the controller permits the driving of the assist motor, when the number of times that at least one of the phase difference and the period difference does not become within a third prescribed range becomes greater than or equal to a fourth prescribed number of times.

A bicycle assist device according to one embodiment of the present invention comprises the bicycle control apparatus described above, an assist motor, a first sensor configured to detect a rotation of a wheel, and a second sensor configured to detect a rotation of a crank or a crankshaft.

According to one embodiment of the bicycle assist device, the second sensor comprises an element configured to detect a magnetic field of a magnet that is provided to the one of the crank and the crankshaft.

According to one embodiment of the bicycle assist device, the second sensor is configured to output a signal corresponding to a rotational angle of the one of the crank and the crankshaft.

According to one embodiment of the bicycle assist device, the second sensor is configured to output a signal corresponding to a manual drive force that is inputted to the crank.

According to one embodiment of the bicycle assist device, the first sensor comprises an element configured to detect a magnetic field of a magnet that is provided to the wheel.

The bicycle control apparatus and a bicycle assist device equipped with this control apparatus of the present invention is able to determine a rotating body to be detected of a sensor that outputs a signal that reflects the rotational speed of a rotating body.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
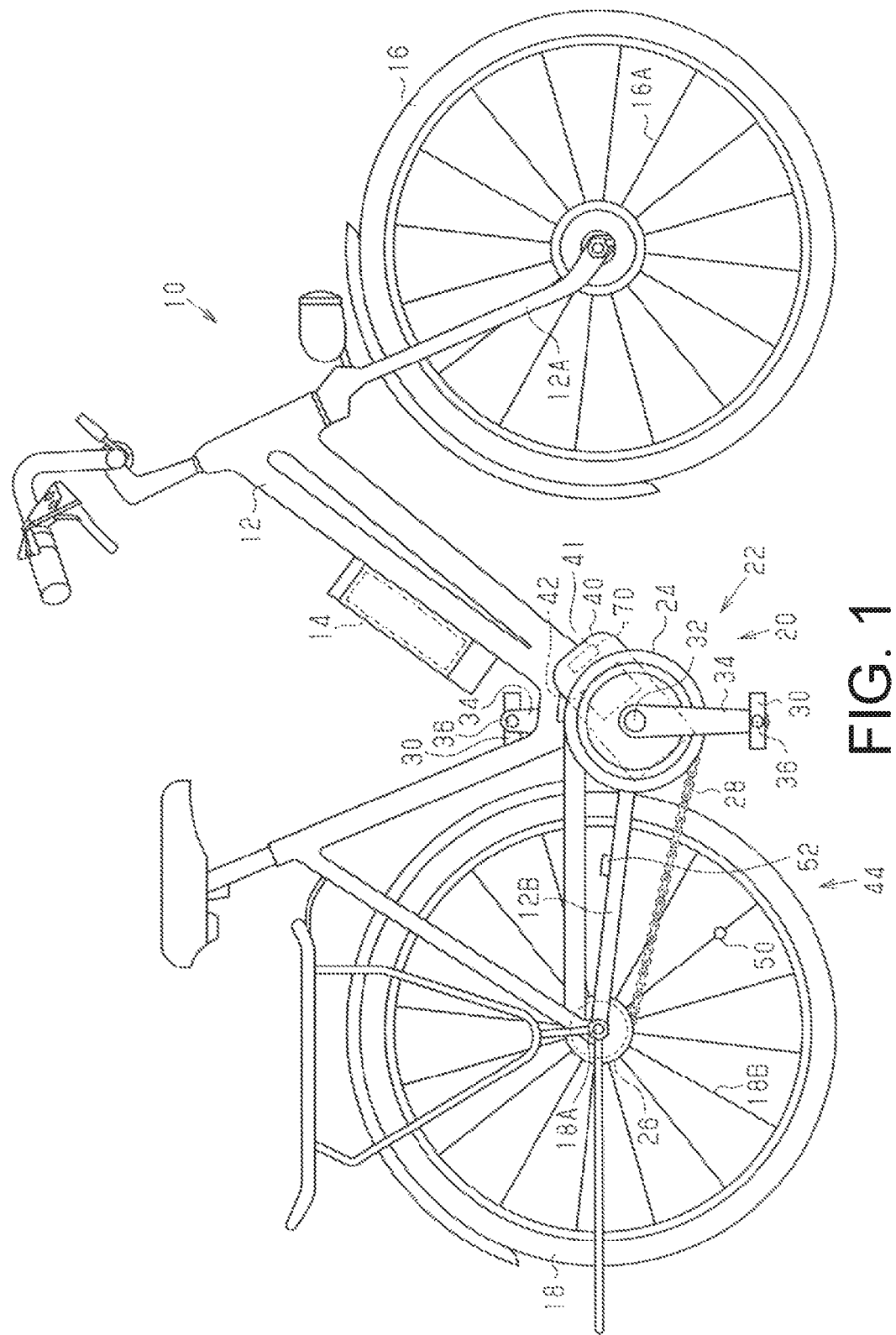
FIG. 1 is a side elevational view of a bicycle equipped with the assist unit provided with the control apparatus in accordance with a first embodiment.

As shown in FIG. 1, a bicycle 10 is illustrated that is equipped with a bicycle assist device in accordance with a first embodiment. The bicycle 10 basically comprises a bicycle body 12, a battery 14, a front wheel 16, a rear wheel 18, a drive mechanism 20 and an assist device 40.

The drive mechanism 20 comprises a crank 22, a front sprocket 24, a rear sprocket 26, a chain 28 and a pair of pedals 30.

The crank 22 comprises a crankshaft 32 that is rotatably supported to the bicycle body 12 and a pair of (left and right) crank arms 34. The left and right crank arms 34 are attached to the crankshaft 32. The main bodies of the pedals 30 are rotatably attached to the crank arms 34 about pedal shafts 36.

The front sprocket 24 is coupled with the crankshaft 32. The front sprocket 24 is provided coaxially with the crankshaft 32. The front sprocket 24 can be coupled so as to not rotate relatively with the crankshaft 32, or be coupled via a one-way clutch (not shown) so that the front sprocket 24 will also roll forward when the crankshaft 32 rolls forward.

The rear sprocket 26 is rotatably attached around an axle 18A of the rear wheel 18. The rear sprocket 26 is coupled with the rear wheel 18 via a one-way clutch (not shown). The chain 28 is wound to the front sprocket 24 and the rear sprocket 26. When the crank arms 22 rotate due to a manual drive force that is applied to the pedals 30, the rear wheel 18 is rotated by the front sprocket 24, the chain 28 and the rear sprocket 26.

Figure 2:
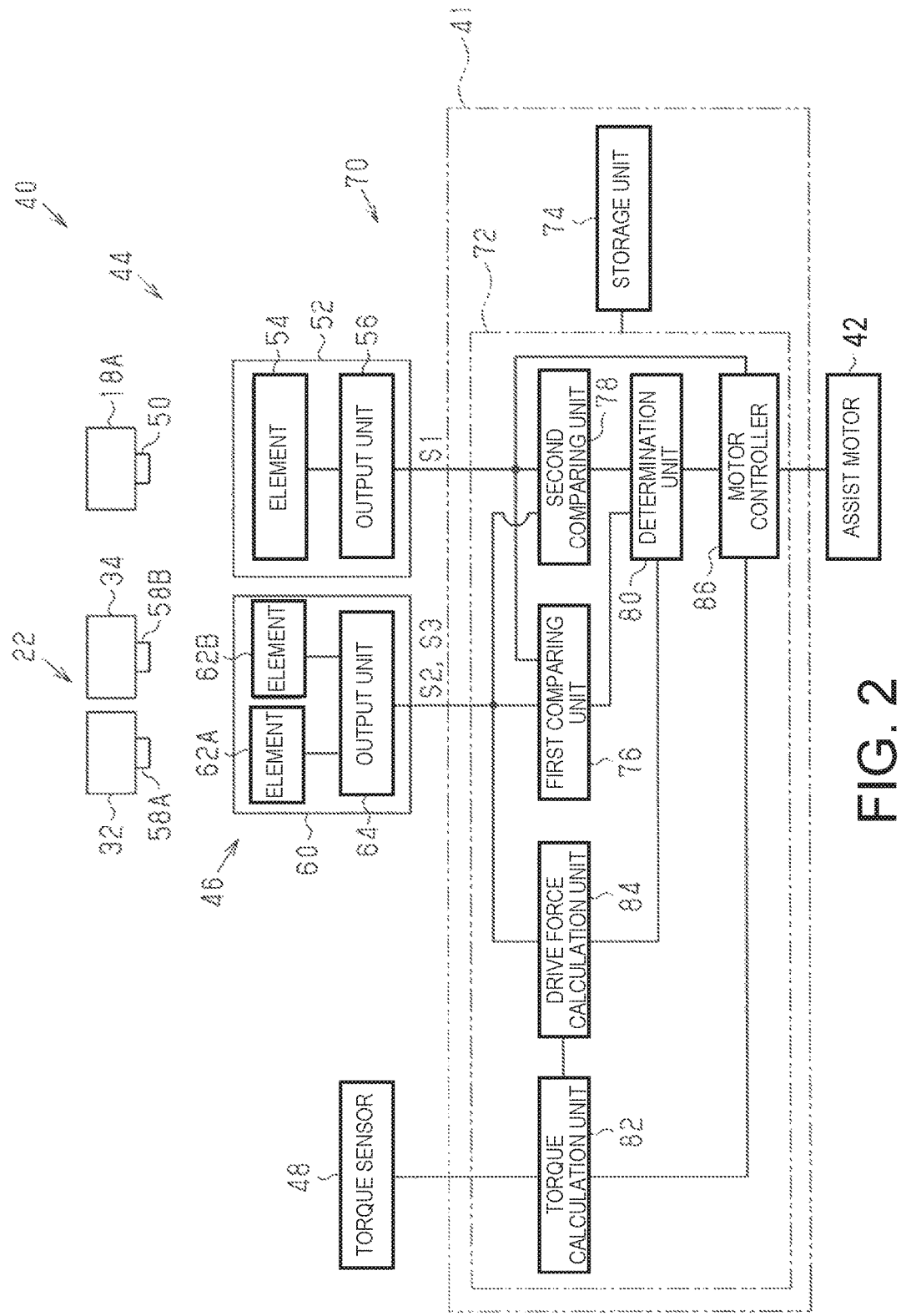
FIG. 2 is a block diagram of the assist device that is mounted on the bicycle illustrated in FIG. 1.

As shown in FIG. 2, the assist device 40 comprises an assist motor 42, a first detection device 44, a second detection device 46 and a torque sensor 48. The assist motor 42 is configured to assist the manual drive force inputted by pedaling. The first detection device 44 includes comprises a magnet 50 and a first sensor 52. The second detection device 46 includes a second sensor 60. The assist device 40 further comprises a control apparatus 70.

In the present embodiment, the assist motor 42 is provided to a drive unit 41 that rotatably supports the crankshaft 32. The assist motor 42 is coupled to the front sprocket 24 directly, or indirectly via a reduction gear. The assist motor 42 can be provided to at least one of the front wheel 16 and the rear wheel 18.

The first sensor 52 outputs a signal that reflects the rotational speed of a rotating body provided to the bicycle 10. The first sensor 52 can be attached to the drive unit 41 or a bicycle body 12 as shown in FIG. 1 with a bolt and a nut, a band, or the like. For example, the magnet 50 can be attached to the spokes 16A of the front wheel 16, and the first sensor 52 can be attached to the front fork 12A of the bicycle body 12. Further, the magnet 50 can be attached to the spokes 18B of the rear wheel 18, and the first sensor 52 can be attached to the drive unit 41 or the chain stay 12B of the bicycle body 12.

The first sensor 52 is configured to detect the rotational of the front wheel 16 or the rear wheel 18 by being attached to the bicycle body 12. When the first sensor 52 is attached to the front fork 12A of the bicycle body 12, the front wheel 16 is the rotating body to be detected of the first sensor 52. When the first sensor 52 is attached to the drive unit 41 or the chain stay 12B of the bicycle body 12, the rear wheel 18 is the rotating body to be detected of the first sensor 52. In the present embodiment, an example in which the rotation of the rear wheel 18 is detected by the first sensor 52 will be described below. However, the same applies when detecting the rotation of the front wheel 16 by the first sensor 52 as well.

The first sensor 52 is electrically connected to the control apparatus 70 by an electrical cable. The first sensor 52 transmits a first signal S1 to the control apparatus 70 according to a rotation of the front wheel 16 or the rear wheel 18. As shown in FIG. 2, the first sensor 52 includes an element 54 and an output unit 56. The element 54 is configured to detect a magnetic field. The output unit 56 is configured to transmit the first signal S1 to the control apparatus 70. The first sensor 52 is configured to detect the magnet 50 that is attached to the front wheel 16 or the rear wheel 18. Specifically, the element 54 output a value corresponding to changes in the relative position of the magnet 50. The output unit 56 outputs a signal in which one rotation of the rotating body to be detected is one period. That is, the first sensor 52 outputs the first signal S1 each time the rotating body is detected to have rotated 360 degrees.

The second detection device 46 is configured to detect a rotation of the crankshaft 32. The second detection device 46 comprises a pair of magnets 58A and 58B and a second sensor 60. The second sensor 60 is attached to the bicycle body 12. The magnet 58A is an annular magnet having a plurality of magnetic poles alternately arranged side by side in the circumferential direction. The magnet 58A is attached to one of the crankshaft 32, a power transmission part transmitting power between the crankshaft 32 and the front sprocket 24, the front sprocket 24, or one of the left and right crank arms 34. The magnet 58A is arranged coaxially with the crankshaft 32. The magnet 58B is attached to one of the crankshaft 32, the power transmission part transmitting power between the crankshaft 32 and the front sprocket 24, the front sprocket 24, or one of the left and right crank arms 34. The second sensor 60 is preferably provided in the housing of the drive unit 41.

The second sensor 60 is electrically connected to the control apparatus 70 by an electrical cable. The second sensor 60 transmits a second signal S2 to the control apparatus 70 according to a rotation of the crank 22. The second sensor 60 is configured to detect the magnets 58A and 58B. The second sensor 60 includes elements 62A and 62B and an output unit 64. The elements 62A and 62B are each configured to detect a magnetic field of the magnets 58A and 58B. The element 62A detects a relative angular position of the crank 22 with respect to the bicycle body 12 (i.e., the bicycle frame). The element 62B detects a reference angular position of the crank 22 with respect to the bicycle body 12 (i.e., the bicycle frame). The second sensor 60 functions as a so-called cadence sensor and an angle sensor. The element 62A functions as the angle sensor, and the element 62B functions as the cadence sensor. Specifically, the element 62A outputs a signal to the output unit 64 in which one period is the angle obtained by dividing 360° by the number of magnetic poles with the same polarity, when the crankshaft 32 makes one rotation. The element 62B outputs a signal to the output unit 64 in which one period is one rotation of the crankshaft. The output unit 64 outputs a second signal S2 corresponding to the rotational angle of the crank 22. The second signal S2 includes at least one of a signal that is outputted by the element 62A, and a signal that is outputted by the element 62B. The minimum angle of the crank 22 that can be detected by the second sensor 60 is less than or equal to 180 degrees, preferably 15 degrees, and more preferably 6 degrees.

The torque sensor 48 is configured to detect the manual drive force that is applied to the crank 22. The torque sensor 48 is configured to output a third signal S3 that includes a signal corresponding to the manual drive force. The torque sensor 48 can be provided between the crankshaft 32 and the front sprocket 24, attached to the crankshaft 32 or the front sprocket 24, or attached to the crank arms 34 or the pedals 30. The torque sensor 48 can include, for example, a strain sensor, a magnetostrictive sensor, an optical sensor, or a pressure sensor, and any sensor that outputs a signal corresponding to the manual force that is applied to the crank arm 34 or the pedal 30 can be employed.

As shown in FIG. 2, the control apparatus 70 comprises a controller 72 and a storage unit 74 that stores various information. The controller 72 is formed comprising a calculation processing device such as a CPU or an MPU that includes a one or more processors. Software is stored in the storage unit 74. The storage unit 74 is preferably any memory device (i.e., a non-transitory computer readable medium such as a ROM (Read Only Memory) device, hard disk, etc.). The controller 72 executes software that is stored in the storage unit 74 to achieve a plurality of functions of the control apparatus 70. The control apparatus 70 can comprise a plurality of calculation processing devices, and comprise a plurality of microcomputers. The controller 72 includes a counter function.

The controller 72 comprises a first comparing unit 76, a second comparing unit 78, a determination unit 80, a torque calculation unit 82, a drive force calculation unit 84 and a motor controller 86. The first comparing unit 76, the second comparing unit 78, the determination unit 80, the torque calculation unit 82, the drive force calculation unit 84, and the motor controller 86 represent the functions of the control apparatus 70.

The first comparing unit 76 is configured (programmed) to compare the change in speed of the rotating body that is detected by the first sensor 52, and the change in speed of the rotating body that is detected by the second sensor 60. The first comparing unit 76 calculates a first speed change DA and a second speed change DB. The first speed change DA is obtained by differentiating a first rotational speed VA of a rotating body that is calculated based on the first signal S1 that is outputted from the first sensor 52. The second speed change DB is obtained by differentiating a second rotational speed VB of a rotating body that is calculated based on the second signal S2 that is outputted from the second sensor 60. The first comparing unit 76 determines whether or not a difference ΔD between the first speed change DA and the second speed change DB is within a second prescribed range ΔDX. The difference ΔD being within a prescribed range ΔDX means that the difference ΔD is less than or equal to an upper limit value and greater than or equal to the lower limit value of the prescribed range ΔDX. When the upper limit value and the lower limit value of the prescribed range ΔDX are equivalent, that is, if the prescribed range ΔDX is a constant value (for example "0"), the difference ΔD being within a prescribed range ΔDX means that the difference ΔD is a prescribed value.

The second comparing unit 78 is configured (programmed) to compare a phase of a first signal that is outputted by the first sensor 52 and a phase of a second signal that is outputted by the second sensor 60. When the second comparing unit 78 compares the phases using the signals that are outputted by the element 54 and the element 62A, the second comparing unit 78 calculates the rotational angle of the crank 22 (hereinafter referred to as "crank rotational angle CA") that is detected by the second sensor 60 at a timing at which the first signal S1 is outputted from the first sensor 52. The second comparing unit 78 determines whether or not a difference ΔF between the crank rotational angle CA at the previous timing at which the first signal S1 is outputted from the first sensor 52, and the crank rotational angle CA at a current timing at which the first signal S1 is outputted from the first sensor 52, is within a first prescribed range ΔFX. The difference ΔF being within a prescribed range ΔFX means that the difference ΔF is less than or equal to an upper limit value and greater than or equal to a lower limit value of the prescribed range ΔFX. When the upper limit value and the lower limit value of the prescribed range ΔFX are equivalent, that is, if the prescribed range ΔFX is a constant value (for example "0"), the difference ΔF being within a prescribed range ΔFX means that the difference ΔF is a prescribed value. When the second comparing unit 78 compares the phases using signals that are outputted by the element 54 and the element 62B, the second comparing unit 78 calculates the difference between the timing at which the first signal S1 was outputted from the first sensor 52 and the timing at which the second signal S2 was outputted from the second sensor 60, that is, the difference ΔF of the phases of the first signal S1 and the second signal S2. More specifically, the second comparing unit 78 calculates the difference between the timing at which the first signal S1 is outputted and the timing at which the element 62B detects the reference angular position of the crank 22 as the phase difference ΔF. In this case, the second comparing unit 78 determines whether or not the difference between the phase difference ΔF of the phases of the previous first signal S1 and the previous second signal S2, and the phase difference ΔF of the phases of the current first signal S1 and the current second signal S2, is within the first prescribed range ΔFX. In this manner, even if the second sensor 60 comprises only one of the elements 62A and 62B, the second comparing unit 78 is able to compare the phase of a signal that is outputted by the first sensor 52 and the phase of a signal that is outputted by the second sensor 60. Also the second comparing unit 78 can be set in advance, or configured to be selectable by a user to use one of the signals outputted from the element 62A or 62B of the second sensor 60.

The determination unit 80 is configured (programmed) to determine whether or not a detection target of the first sensor 52 and a detection target of the second sensor 60 are the same rotating body. Specifically, the determination unit 80 determines whether or not the detection targets of the first sensor 52 and the second sensor 60 are the same rotating body, based on the comparison result between the first speed change DA and the second speed change DB by the first comparing unit 76, and the comparison result between the phase of the first signal S1 and the phase of the second signal S2 by the second comparing unit 78. That is, the determination unit 80 determines whether or not the detection targets of the first sensor 52 and the second sensor 60 are the same rotating body, based on the output of the first sensor 52 and the output of the second sensor 60.

The torque calculation unit 82 is configured (programmed) to calculate the torque τ that is applied to the crankshaft 32 based on the output of the torque sensor 48.

The drive force calculation unit 84 is configured (programmed) to calculate the drive force based on at least one of the torque τ and the first rotational speed VA. For example, the drive force R becomes small when traveling downhill and becomes large when traveling uphill. The drive force R can be energy that is inputted to the crank 22 by the rider, or torque that is applied to the crank 22. The energy that is inputted to the crank 22 can be calculated from the output values of the torque sensor 48 and the element 62A. The torque that is applied to the crank 22 can be calculated from the output value of the torque sensor 48.

The motor controller 86 is configured (programmed) to control the assist motor 42 based on the output of the first sensor 52 and the output of the torque sensor 48. Specifically, the motor controller 86 supplies power of the battery 14 (refer to FIG. 1) to the assist motor 42, based on the torque 17 and the first rotational speed VA and drives the assist motor 42. Further, the motor controller 86 permits the driving of the assist motor 42 when the bicycle speed V calculated based on the first rotational speed VA is less than a first speed VX, and stops the driving of the assist motor 42 when the bicycle speed V is greater than or equal to the first speed VX. Meanwhile, the bicycle speed V is calculated based on the first rotational speed VA, and the circumferential length, the diameter, or the radius of the wheel, which is stored in advance. The first speed VX is, for example, 25 km per hour.

Further, the motor controller 86 is configured (programmed) to control the assist motor 42 based on the detection result of whether or not the detection targets of the first sensor 52 and the second sensor 60 are the same rotating body. Specifically, the motor controller 86 prohibits the driving of the assist motor 42, when the detection target of the first sensor 52 and the detection target of the second sensor 60 are determined to be the same rotating body, based on the determination result of the determination unit 80. The controller 72 stores the information indicating that the driving of the assist motor 42 is prohibited to the storage unit 74. The storage unit 74 is formed of nonvolatile memory, and the information that is stored in the storage unit 74 is maintained in a stored state even when the battery 14 is removed from the assist device 40. When the detection target of the first sensor 52 and the detection target of the second sensor 60 are determined to be the same rotating body based on the determination result of the determination unit 80, the motor controller 86 can stop the supply of power to the assist motor 42. The motor controller 86 permits the driving of the assist motor 42, when the detection target of the first sensor 52 and the detection target of the second sensor 60 are determined not to be the same rotating body, based on the determination result of the determination unit 80.

Figure 3:
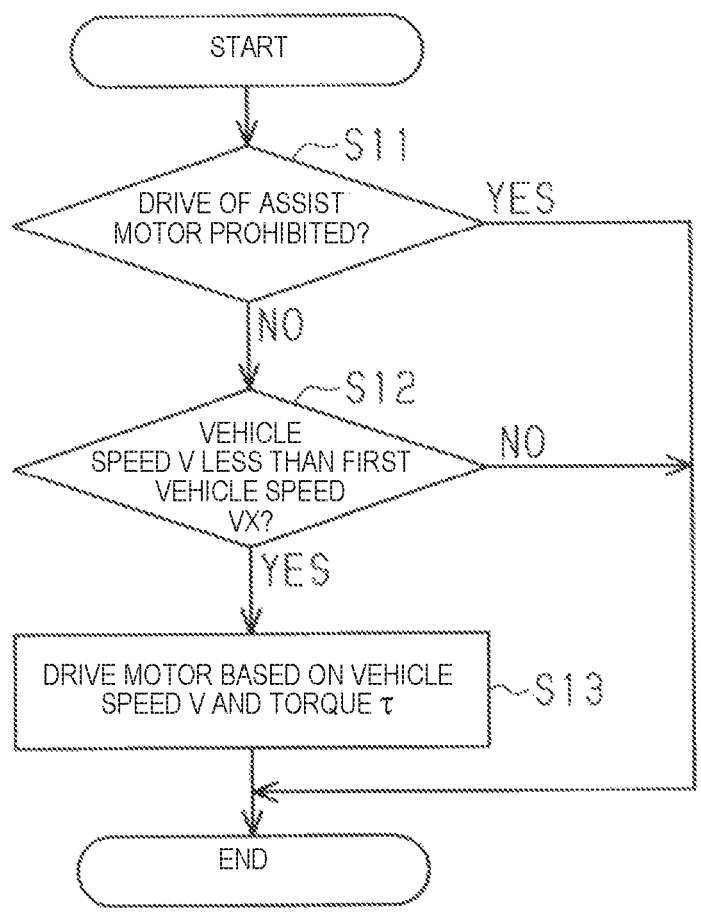
FIG. 3 is a flowchart of the process of driving the assist motor executed by the controller of FIG. 2.

The calculation process of the motor control process that is executed by the motor controller 86 of the controller 72 will be described, with reference to FIG. 3. Meanwhile, the present process is started when power is supplied to the control apparatus 70, or when an operation mode in which the assist motor 42 is drivable is selected. After the present process is temporarily ended, the process are repeated from Step S11 again every prescribed period, until the supply of power to the control apparatus 70 is stopped, or, when an operation mode in which the assist motor 42 is not driven is selected.

The motor controller 86 determines whether or not the driving of the assist motor 42 is prohibited in Step S11. When the driving of the assist motor 42 is prohibited, the motor controller 86 ends the present process without driving the assist motor 42.

When the driving of the assist motor 42 is permitted, the motor controller 86 proceeds to Step S12 and determines whether or not the bicycle speed V is less than the first bicycle speed VX. When the bicycle speed V is less than the first bicycle speed VX, the motor controller 86 drives the assist motor 42 based on the bicycle speed V and the torque τ in Step S13. A map that defines the relationship between the output torque of the assist motor 42 and the bicycle speed V or the torque τ is stored in the storage unit 74. The relationship between the output torque of the assist motor 42 and the torque τ is the so-called assist ratio. When the bicycle speed V is greater than or equal to the first bicycle speed VX, the motor controller 86 ends the present process without driving the assist motor 42.

The first bicycle speed VX that is used in Step S12 and the map that is used in Step S13 are prepared to conform to when the first sensor 52 is detecting the rotational speed of the front wheel 16 or the rear wheel 18. Consequently, when the first sensor 52 is attached to the bicycle 10 so as to detect the rotational speed of the crank 22, there is the risk that an appropriate control of the assist motor 42 with respect to the actual running state of the bicycle 10 is not executed. Therefore, the controller 72 sets the prohibition and the permission of the driving of the assist motor 42, which is used in the determination of Step S11, based on the determination process of whether or not the detection target of the first sensor 52 and the detection target of the second sensor 60 are the same rotating body. The determination process includes a first comparison process, a driving prohibition process of the assist motor 42, a second comparison process, and a driving permitting process of the assist motor 42.

Figure 4:
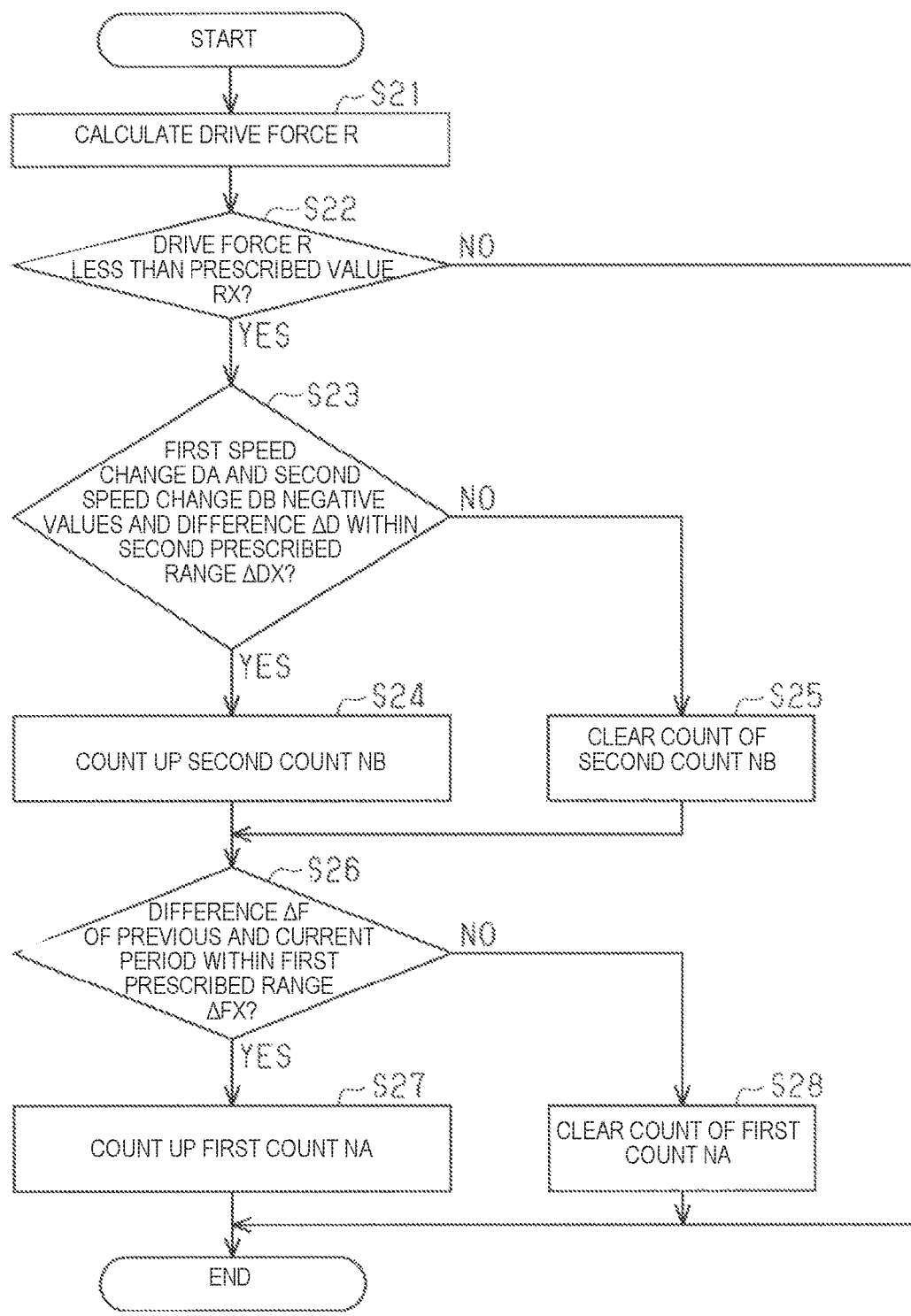
FIG. 4 is a flowchart of a first comparison process executed by the controller illustrated in FIG. 2.

The first comparison process that are executed by the drive force calculation unit 84 of the controller 72, the first comparing unit 76, and the second comparing unit 78 will be described, with reference to FIG. 4. Meanwhile, the present process is started when power is supplied to the control apparatus 70, or when an operation mode in which the assist motor 42 is drivable is selected. After the present process is temporarily ended, the steps are repeated from Step S21 again every prescribed period, until the supply of power to the control apparatus 70 is stopped, or, when an operation mode in which the assist motor 42 is not driven is selected.

The controller 72 calculates the drive force R in Step S21. The controller 72 determines whether or not the drive force R calculated in Step S21 is less than a prescribed value RX, in Step S22. When the drive force R is greater than or equal to the prescribed value RX, the controller 72 ends the present process. On the other hand, when the drive force R is less than the prescribed value RX, the controller 72 proceeds to Step S23 and continues the first comparison process. When the bicycle 10 is traveling in a state in which the drive force R is small, the prescribed value RX is, for example, set to a value corresponding to the drive force R of when traveling downhill.

In Step S23, the first comparing unit 76 of the controller 72 determines whether or not the first speed change DA and the second speed change DB are both negative values, and, whether or not the difference ΔD between the first speed change DA and the second speed change DB is within a second prescribed range ΔDX. When the first speed change DA and the second speed change DB are both negative values and the difference ΔD is within the second prescribed range ΔDX, the controller 72 counts up a second count NB in Step S24, and proceeds to Step S26. On the other hand, when at least one of the first speed change DA and the second speed change DB is a positive value, or the difference ΔD is within the second prescribed range ΔDX in Step S23, the controller 72 clears the count of the second count NB in Step S25, and proceeds to Step S26. That is, when the rotating body to be detected of the first sensor 52 and the rotating body to be detected of the second sensor 60 are both decelerating, and decelerating at a similar speed, the controller 72 counts up the second count NB.

In Step S26, the second comparing unit 78 of the controller 72 determines whether or not the difference ΔF between the crank rotational angle CA of the previous timing at which the first signal S1 is outputted from the first sensor 52, and the crank rotational angle CA of the current timing at which the first signal S1 is outputted from the first sensor 52, is within a first prescribed range ΔFX, during a forward rotation of the crank 22. Meanwhile, a forward rotation of the crank 22 indicates that the crank 22 is rotated in a positive rotation direction corresponding to the direction in which the bicycle 10 moves forward. When difference ΔF is within the first prescribed range ΔFX, the controller 72 counts up the first count NA and ends the step in Step S27. When difference ΔF is not within the first prescribed range ΔFX in Step S26, the controller 72 clears the count of the first count NA and ends the step in Step S28. Meanwhile, it is possible to execute the process of Steps S26-S28 before Steps S23-S25, and to execute the process of Steps S23-S25 after executing the process of Steps S26-S28.

Figure 5:
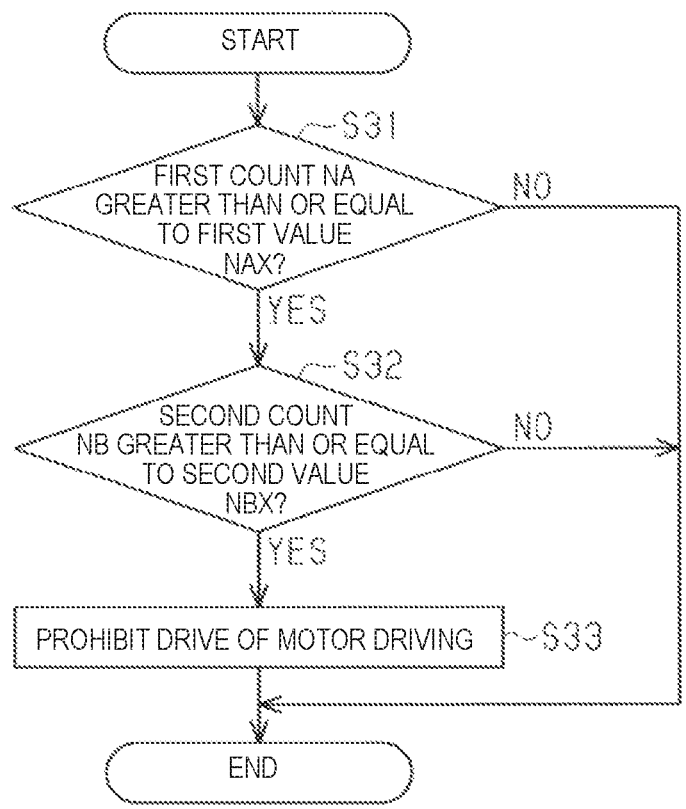
FIG. 5 is a flowchart of the process to prohibit the driving of the assist motor executed by the controller illustrated in FIG. 2.

The driving prohibition process of the assist motor 42 will be described with reference to FIG. 5. Meanwhile, the present process is started when power is supplied to the control apparatus 70, or when an operation mode in which the assist motor 42 is drivable is selected. After the present process is temporarily ended, the process are repeated from Step S31 again every prescribed period, until the supply of power to the control apparatus 70 is stopped, or, when an operation mode in which the assist motor 42 is not driven is selected.

In Step S31, the controller 72 determines whether or not a first count NA is greater than or equal to a first value NAX. When the first count NA is less than the first value NAX, the controller 72 ends the present process. When the first count NA is greater than or equal to the first value NAX, the controller 72 determines whether or not the second count NB is greater than or equal to a second value NBX, in Step S32. When the second count NB is less than the second value NBX, the controller 72 ends the present process. On the other hand, when the second count NB is greater than or equal to the second value NBX, the controller 72 prohibits the driving of the assist motor 42 in Step S33 and ends the present process. The first value NAX and the second value NBX are set in advance, but can be changeable. For example, at least one of the first value NAX and the second value NBX stored in the storage unit 74 can be changed by connecting an external computer to the controller 72. Meanwhile, the step of Step S32 can be executed before Step S31 so that Step S31 is executed after executing the step of Step S32.

Figure 6:
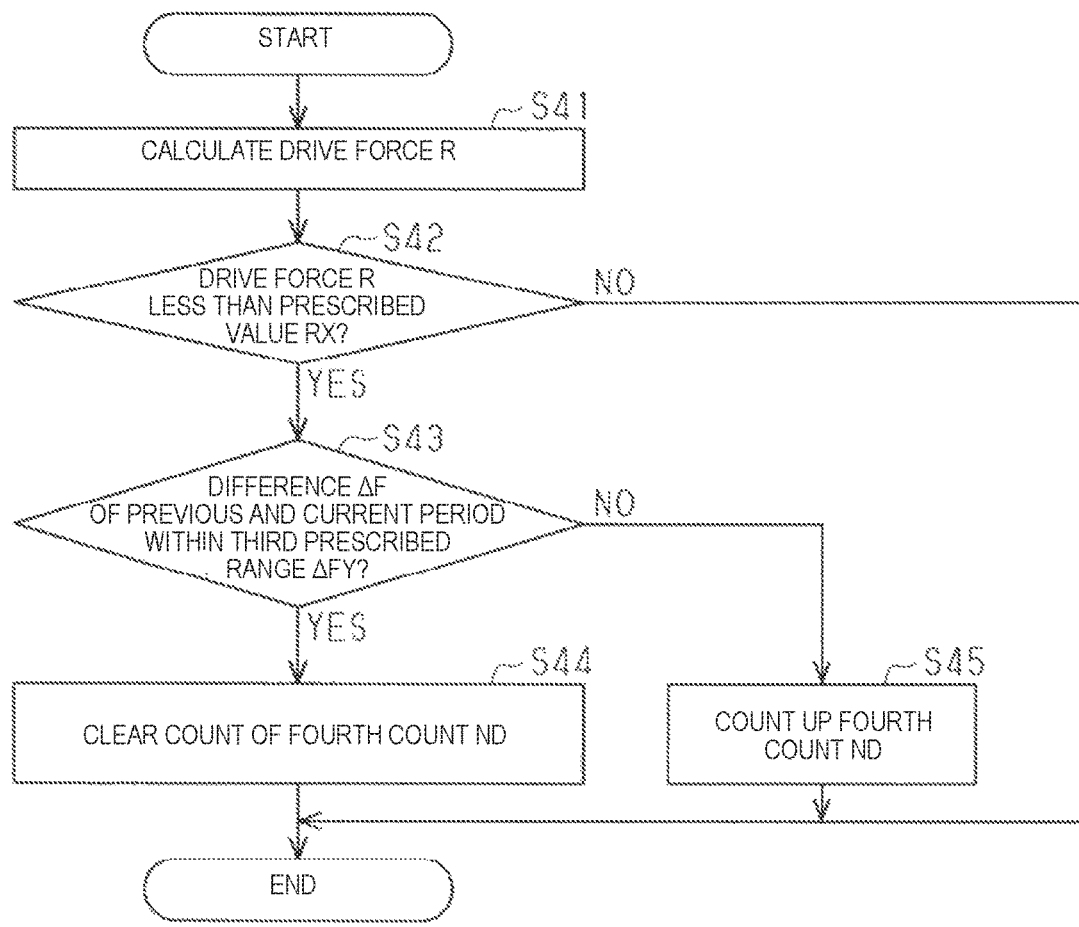
FIG. 6 is a flowchart of a second comparison process executed by the controller illustrated in FIG. 2.

The second comparison process that is executed by the controller 72 is described with reference to FIG. 6. Meanwhile, the present process is started when power is supplied to the control apparatus 70, or when an operation mode in which the assist motor 42 is drivable is selected. After the present process is temporarily ended, the process are repeated from Step S41 again every prescribed period, until the supply of power to the control apparatus 70 is stopped, or, when an operation mode in which the assist motor 42 is not driven is selected.

The controller 72 calculates the drive force R in Step S41. The controller 72 determines whether or not the drive force R calculated in Step S41 is less than a prescribed value RX, in Step S42. When the drive force R is less than the prescribed value RX, the controller 72 proceeds to Step S43. On the other hand, when the drive force R is greater than or equal to the prescribed value RX, the controller 72 ends the present process.

In Step S43, the second comparing unit 78 of the controller 72 determines whether or not the difference $\Delta F$ is within the third prescribed range $\Delta FY$. When the difference $\Delta F$ is within the third prescribed range $\Delta FY$, the controller 72 clears the count of a fourth count ND and ends the step in Step S44. On the other hand, when the difference $\Delta F$ is not within the third prescribed range $\Delta FY$, the controller 72 counts up the fourth count ND and ends the step in Step S45. The difference $\Delta F$ being within a prescribed range $\Delta FY$ means that the difference $\Delta F$ is less than or equal to an upper limit value and greater than or equal to a lower limit value of the prescribed range $\Delta FY$. When the upper limit value and the lower limit value of the prescribed range $\Delta FY$ are equivalent, that is, if the prescribed range $\Delta FY$ is a constant value (for example "0"), the difference $\Delta F$ being within a prescribed range $\Delta FY$ means that the difference $\Delta F$ is "0."

Figure 7:
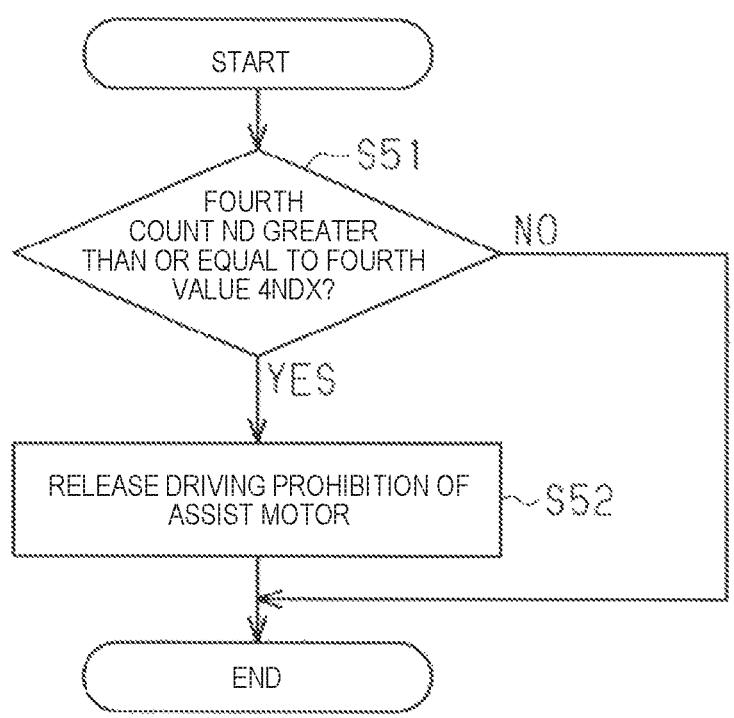
FIG. 7 is a flowchart of the process to permit the driving of the assist motor executed by the controller illustrated in FIG. 2.

The driving permitting process of the assist motor 42 will be described with reference to FIG. 7. Meanwhile, the present process is started when power is supplied to the control apparatus 70, or when an operation mode in which the assist motor 42 is drivable is selected. After the present process is temporarily ended, the process are repeated from Step S51 again every prescribed period, until the supply of power to the control apparatus 70 is stopped, or, when an operation mode in which the assist motor 42 is not driven is selected.

The determination unit 80 of the controller 72 determines whether or not the fourth count ND is greater than or equal to a fourth value 4NDX, in Step S51. When the fourth count ND is less than the fourth value NDX, the controller 72 ends the present process. On the other hand, when the fourth count ND is greater than or equal to the fourth value 4NDX, the controller 72 removes the prohibition of the driving of the assist motor 42 set in Step S33 (refer to FIG. 5) of the driving prohibition process in Step S52, and ends the present process. The controller 72 rewrites the information stored in the storage unit 74, indicating that the driving of the assist motor 42 is prohibited, to information indicating that the driving of the assist motor 42 is permitted. The fourth value NDX is set in advance, but can be changeable. For example, the fourth value NDX stored in the storage unit 74 can be changed by connecting an external computer to the controller 72. Meanwhile, when the prohibition of the driving of the assist motor 42 is not set, the state in which the prohibition of the driving of the assist motor 42 is released is continued. The controller 72 determines that the detection target of the first sensor 52 and the detection target of the second sensor 60 are not the same rotating body, based on the fourth count ND that is calculated from the output of the first sensor 52 and the output of the second sensor 60. When the driving of the assist motor 42 is prohibited based on a determination that the detection target of the first sensor 52 and the detection target of the second sensor 60 are the same rotating body, the controller 72 permits the driving of the assist motor 42 when it is determined that the detection target of the first sensor 52 and the detection target of the second sensor 60 are not the same rotating body.

Figure 8:
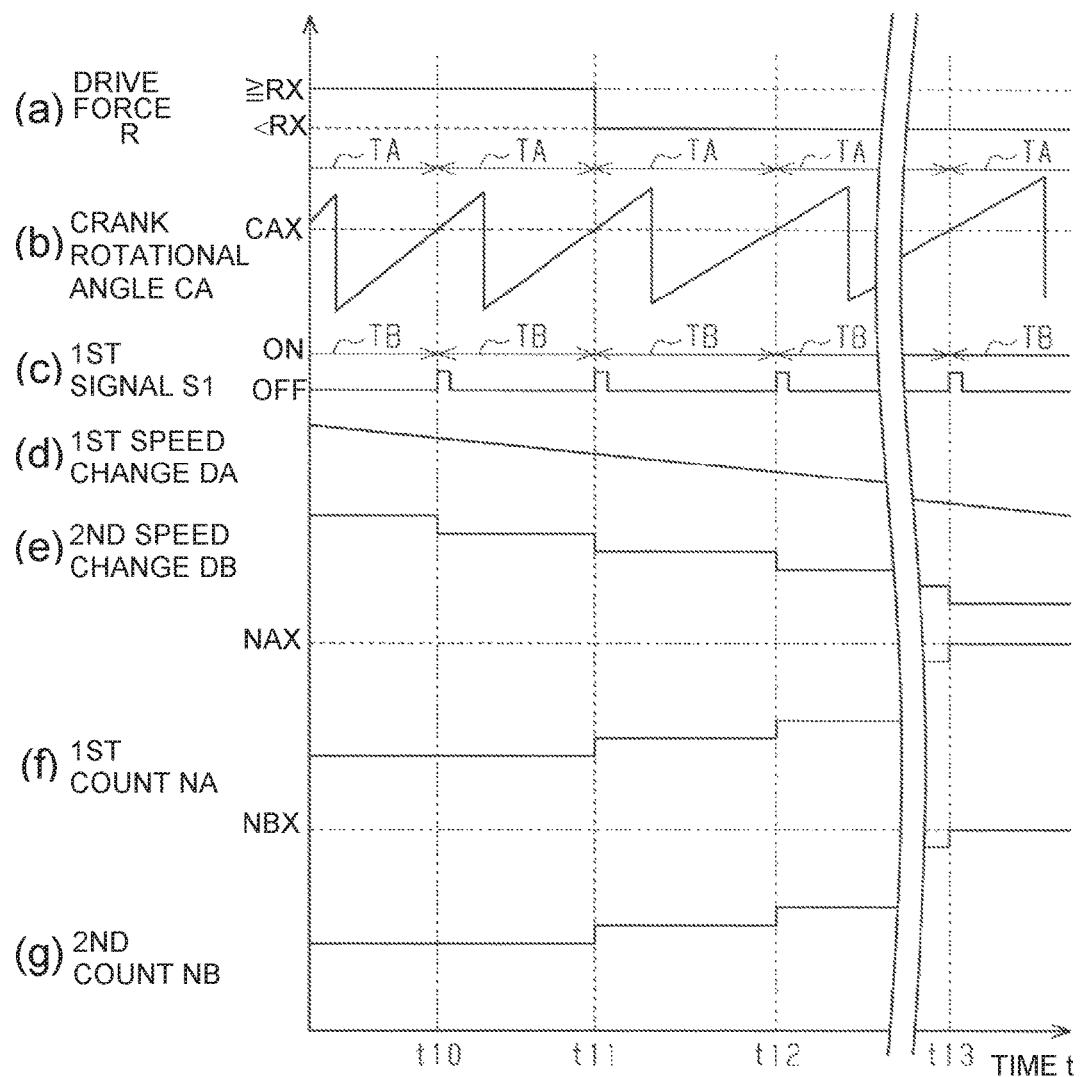
FIG. 8 is a timing chart showing an example of an execution mode of the driving prohibition process of the assist motor illustrated in FIG. 5

An example of an execution mode of the driving prohibition process of the assist motor 42 will be described, with reference to FIG. 8. Time t11 indicates the time when the bicycle 10 is decelerating and the drive force R has become less than the prescribed value RX. At this time, the controller 72 compares the current crank rotational angle CA of when the first signal S1 is detected, and the previous crank rotational angle CA of when the first signal S1 is detected (time t10 in FIG. 8). The current crank rotational angle CA of when the first signal S1 is detected, and the previous crank rotational angle CA of when the first signal S1 is detected are the same angle CAX. Accordingly, the controller 72 determines that the difference $\Delta F$ is within the first prescribed range $\Delta FX$, and counts up the first count NA.

Further, the controller 72 compares the difference $\Delta D$ between the first speed change DA and the second speed change DB. The controller 72 counts up the second count NB based on the difference $\Delta D$ between the first speed change DA and the second speed change DB being within the second prescribed range $\Delta DX$.

Time t12 indicates the time when the first signal S1 is detected again. At this time, the controller 72 compares the current crank rotational angle CA of when the first signal S1 is detected, and the previous crank rotational angle CA of when the first signal S1 is detected (time t11 in FIG. 8). The current crank rotational angle CA of when the first signal S1 is detected, and the previous crank rotational angle CA of when the first signal S1 is detected are the same angle CAX. Accordingly, the controller 72 determines that the difference $\Delta F$ is within the first prescribed range $\Delta FX$, and counts up the first count NA.

Further, the controller 72 compares the difference $\Delta D$ between the first speed change DA and the second speed change DB. The controller 72 counts up the second count NB based on the difference ΔD between the first speed change DA and the second speed change DB being within the second prescribed range ΔDX.

Time t13 indicates the time when the first signal 51 is detected again, after a prescribed duration from time t12. At this time, the controller 72 compares the current crank rotational angle CA of when the first signal S1 is detected, and the previous crank rotational angle CA of when the first signal S1 is detected. The current crank rotational angle CA of when the first signal S1 is detected, and the previous crank rotational angle CA of when the first signal S1 is detected are the same angle CAX. Accordingly, the controller 72 determines that the difference ΔF is within the first prescribed range ΔFX, and counts up the first count NA.

Further, the controller 72 compares the difference ΔD between the first speed change DA and the second speed change DB. The controller 72 counts up the second count NB based on the difference ΔD between the first speed change DA and the second speed change DB being within the second prescribed range ΔDX. As a result, the first count NA becomes greater than or equal to the first value NAX, and the second count NB becomes greater than or equal to the second value NBX. The controller 72 sets a prohibition of the driving of the assist motor 42.

Figure 9:
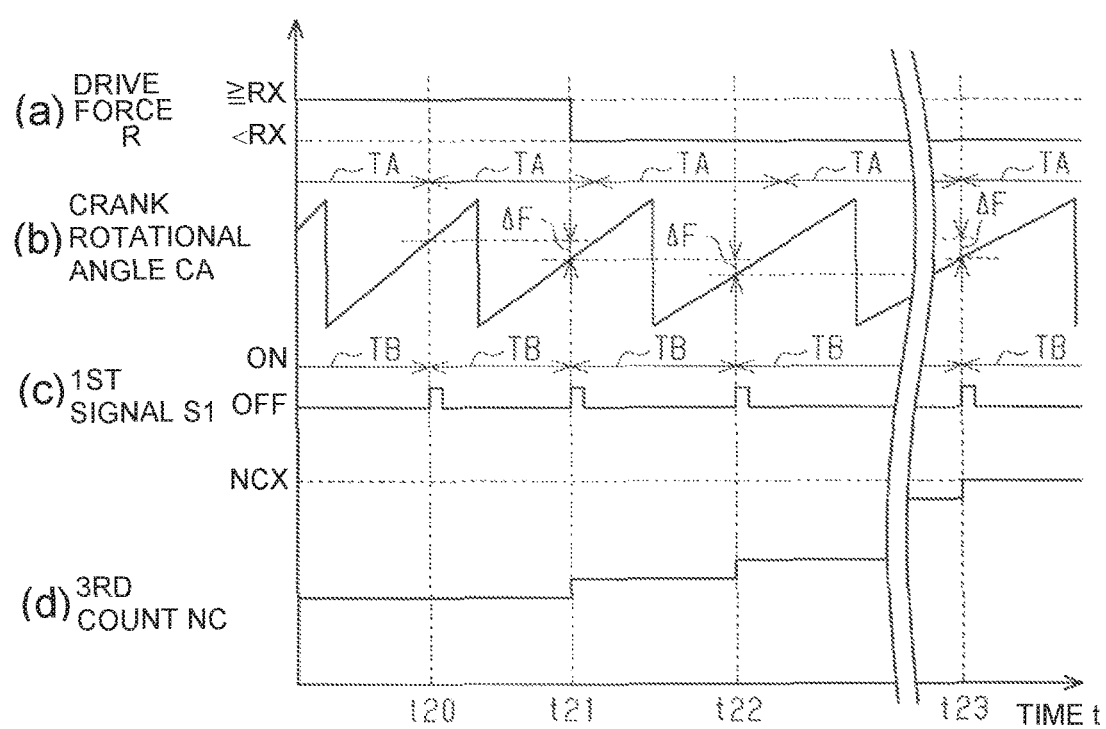
FIG. 9 is a timing chart showing an example of an execution mode of the driving permitting process of the assist motor illustrated in FIG. 7.

An example of an execution mode of the driving permitting process of the assist motor 42 will be described, with reference to FIG. 9. Time t21 indicates the time when the drive force R has become less than the prescribed value RX. At this time, the controller 72 compares the current crank rotational angle CA of when the first signal S1 is detected, and the previous crank rotational angle CA of when the first signal S1 is detected (time t20 in FIG. 9). The controller 72 counts up the fourth count ND based on the difference ΔF between the current crank rotational angle CA of when the first signal S1 is detected, and the previous crank rotational angle CA of when the first signal S1 is detected, not being within the third prescribed range ΔFY.

Time t22 indicates the time when the first signal S1 is detected again. At this time, the controller 72 compares the current crank rotational angle CA of when the first signal S1 is detected, and the previous crank rotational angle CA of when the first signal S1 is detected (time t21 in FIG. 9). The controller 72 counts up the fourth count ND based on the difference ΔF between the current crank rotational angle CA of when the first signal S1 is detected, and the previous crank rotational angle CA of when the first signal S1 is detected, not being within the third prescribed range ΔFY.

Time t23 indicates the time when the first signal S1 is detected again, after a prescribed duration from time t22. At this time, the controller 72 compares the current crank rotational angle CA of when the first signal S1 is detected, and the previous crank rotational angle CA of when the first signal S1 is detected. The controller 72 counts up the fourth count ND based on the difference ΔF between the current crank rotational angle CA of when the first signal S1 is detected, and the previous crank rotational angle CA of when the first signal S1 is detected, being outside the third prescribed range ΔFY. As a result, the fourth count ND becomes greater than or equal to the fourth value 4NDX. Accordingly, the controller 72 releases the prohibition of the driving of the assist motor 42, when the driving of the assist motor 42 is prohibited.

The action of the control apparatus 70 will be described. When the detection targets of the first sensor 52 and the second sensor 60 are different rotating bodies, the period of the output of the first sensor and the period of the output of the second sensor 60 are different, when the gear ratio of the bicycle 10 is other than "1." When the detection target of the first sensor 52 and the detection target of the second sensor 60 are the same rotating body, the difference between the period of the output of the first sensor and the period of the output of the second sensor 60, is included within a prescribed range, even when the gear ratio of the bicycle 10 is other than "1." Further, when the detection targets of the first sensor 52 and the second sensor 60 are different rotating bodies, the period of the output of the first sensor and the period of the output of the second sensor 60 are different under specific conditions, even when the gear ratio of the bicycle 10 is "1." Accordingly, the controller 72 determines whether or not the detection target of the first sensor 52 and the detection target of the second sensor 60 are the same rotating body, using the difference ΔF of the period, and the difference ΔD during deceleration wherein a situation in which the period of the output of the first sensor 52 and the period of the output of the second sensor 60 are different can easily occur.

The effects of the control apparatus 70 will be described.

(1) The controller 72 determines whether or not the detection target of the first sensor 52 and the detection target of the second sensor 60 are the same rotating body. Accordingly, it is possible to determine whether or not the first sensor 52 is detecting the rotational frequency of the crank 22, which is a detection target of the second sensor 60. That is, the control apparatus 70 is able to determine the rotating body to be detected of the first sensor 52.

(2) When it is determined that the first sensor 52 and the second sensor 60 are detecting the state of the same rotating body, the controller 72 prohibits the driving of the assist motor 42. Accordingly, for example, when the actual bicycle speed is greater than or equal to the first bicycle speed VX, the assist motor 42 is suppressed from being driven. Further, the assist motor 42 can be appropriately controlled with respect to the actual bicycle speed.

(3) For example, when the gear ratio of the bicycle 10 is "1," and the rotational speed of the crank 22 and the rotational speed of the front wheel 16 or the rear wheel 18 match, the difference ΔF will be within the first prescribed range ΔFX. Consequently, there is the risk that the controller 72 will determine that the detection targets of the first sensor 52 and the second sensor 60 are the same rotating body, even if the detection targets of the first sensor 52 and the second sensor 60 are different rotating bodies. When the number of times that the difference ΔF becomes within the first prescribed range ΔFX becomes greater than or equal to the first value NAX, and when number of times that the difference ΔD between the first speed change DA of when the first rotational speed VA is reduced and the second speed change DB of when the second rotational speed VB is reduced becomes within the second prescribed range ΔDX becomes greater than or equal to the second value NBX, the controller 72 determines that the detection target of the first sensor 52 and the detection target of the second sensor 60 are the same rotating body. Accordingly, compared to when the detection target of the first sensor 52 and the detection target of the second sensor 60 are determined to be the same rotating body based only on one of the difference ΔF or the difference ΔD, the accuracy of the determination on whether or not the detection target of the first sensor 52 and the detection target of the second sensor 60 are the same rotating body is improved. When applying the present invention to a bicycle assist device in which the gear ratio does not become "1," it is preferable to omit the other steps excluding Steps S26-S28 in the first comparison process of FIG. 4, to omit Step S32 in the driving prohibition process of FIG. 5, and to omit Steps S41 and S42 in the second comparison process of FIG. 6, in order to simply the process. In this case, it is sufficient that the controller 72 comprises only the second comparing unit 78, from among the drive force calculation unit 84, the first comparing unit 76, and the second comparing unit 78.

(4) When the drive force R of the bicycle 10 is smaller than the prescribed value RX, the controller 72 determines whether or not the detection target of the first sensor 52 and the detection target of the second sensor 60 are the same rotating body, based on the output of the first sensor 52 and the output of the second sensor 60. When the drive force R is small, the degree of deceleration of the rotational speed of the front wheel 16 or the rear wheel 18 with respect to the degree of deceleration of the rotational speed of the crank 22 is likely to be small. Accordingly, the difference ΔF is prone to be outside of the first prescribed range ΔFX when the detection targets of the first sensor 52 and the second sensor 60 are different rotating bodies, even when the gear ratio is "1." Further, the difference ΔD is prone to be outside of the second prescribed range ΔDX when the detection targets of the first sensor 52 and the second sensor 60 are different rotating bodies, even when the gear ratio is "1." Accordingly, the accuracy of the determination on whether or not the detection target of the first sensor 52 and the detection target of the second sensor 60 are the same rotating body is improved.

(5) When the driving of the assist motor 42 is prohibited based on a determination that the detection target of the first sensor 52 and the detection target of the second sensor 60 are the same rotating body, the controller permits the driving of the assist motor, when the number of times that the difference between the phase of the output of the first sensor 52 and the phase of the output of the second sensor 60 becomes within the third prescribed range ΔFY becomes greater than or equal to a fourth prescribed value.

Second Embodiment

The control apparatus 70 of the second embodiment will be described, with reference to FIGS. 10 and 11. The control apparatus 70 of the second embodiment executes the first comparison process shown in FIG. 10, instead of the first comparison process shown in FIG. 4 of the first embodiment. The control apparatus 70 of the second embodiment executes the driving prohibition process of the assist motor 42 shown in FIG. 11, instead of the driving prohibition process of the assist motor 42 of FIG. 5 of the first embodiment. The configurations that are common to the first embodiment are given the same codes as the first embodiment, and the descriptions thereof will be omitted.

Figure 10:
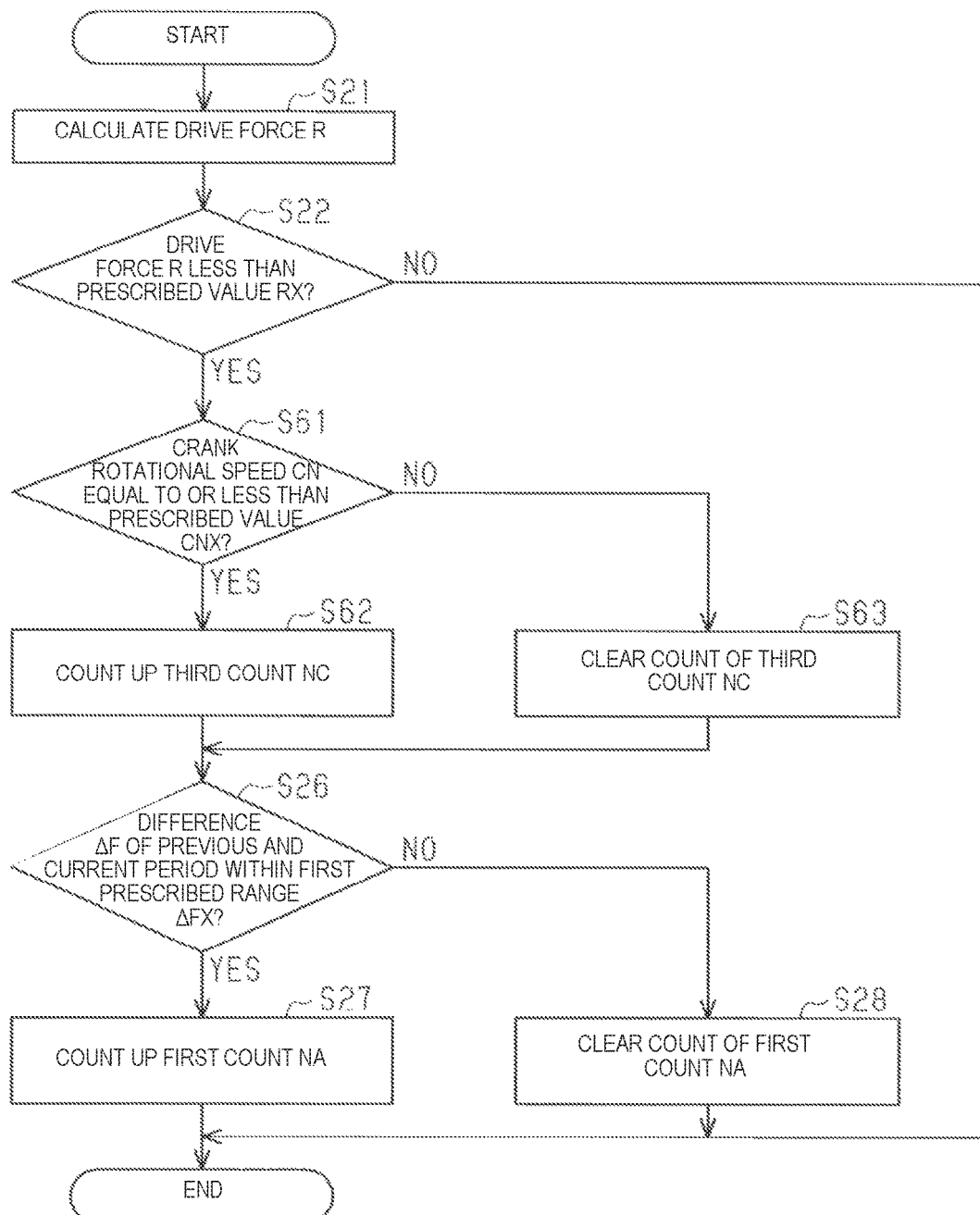
FIG. 10 is a flowchart of the first comparison process that is executed by the controller of a control apparatus in accordance with a second embodiment.

As shown in FIG. 10, in the first comparison process of the second embodiment, Steps S61-S63 are executed instead of Steps S23-S25 of the first comparison process of the first embodiment.

When the drive force R is less than the prescribed value RX in Step S22, the controller 72 proceeds to Step S61 and continues the first comparison process. In Step S61, the first comparing unit 76 of the controller 72 determines whether or not a rotational speed CN of the crank 22 in the forward rotational direction has become less than or equal to a prescribed value CNX. Specifically, the controller 72 determines whether or not the second rotational speed VB has become less than or equal to a prescribed rotational speed VBX from a value greater than "0," based on an output of the second sensor 60. The prescribed rotational speed VBX is selected to be a value in the range of, for example, 3 rpm-10 rpm. The prescribed rotational speed VBX can be selected to be, for example, 0 rpm. When the prescribed rotational speed VBX is 0 rpm, the prescribed value CNX is 0. In Step S61, the first comparing unit 76 of the controller 72 can determines whether or not the crank 22 has stopped. When the rotational speed CN of the crank 22 in the forward rotational direction becomes equal to or less than the prescribed value CNX, the controller 72 counts up a third count NC in Step S62, and proceeds to Step S26. On the other hand, when the rotational speed CN of the crank 22 in the forward rotational direction exceeds the prescribed value CNX in Step S61, the controller 72 clears the count of the third count NC in Step S63, and proceeds to Step S26.

Figure 11:
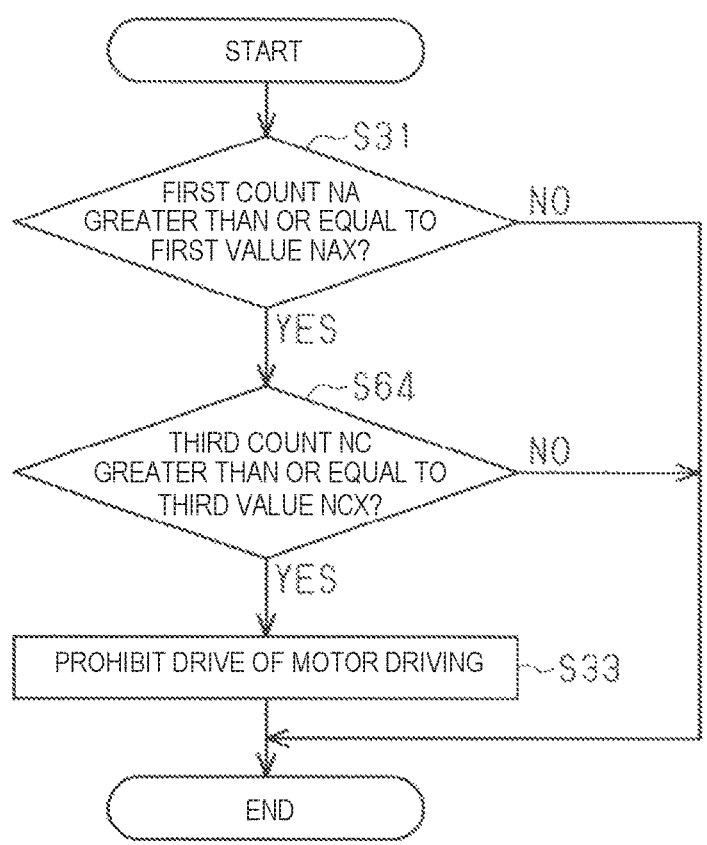
FIG. 11 is a flowchart of the driving prohibition process of the assist motor that is executed by the controller of the control apparatus in accordance with the second embodiment.

As shown in FIG. 11, in the driving prohibition process of the assist motor 42 in the second embodiment, Step S64 is executed instead of Step S32 of the driving prohibition process of the assist motor 42 of the first embodiment.

In Step S31, the controller 72 determines whether or not a first count NA is greater than or equal to a first value NAX. When the first count NA is less than the first value NAX, the controller 72 ends the present process. On the other hand, when the first count NA is greater than or equal to the first value NAX, the controller 72 determines whether or not the third count NC is greater than or equal to a third value NCX in Step S64. When the third count NC is less than the third value NCX, the controller 72 ends the present process. On the other hand, when the third count NC is greater than or equal to the third value NCX, the controller 72 prohibits the driving of the assist motor 42 in Step S33 and ends the present process.

The controller 72 sets a prohibition of the driving of the assist motor 42 based on this determination result. The control apparatus 70 of the second embodiment exerts the following effects, in addition to the effects of (1), (2), (4) and (5) of the first embodiment.

(6) When the rotational speed CN of the crank 22 becomes equal to or less than the prescribed value CNX, the rotation of the crank 22 is likely to be stopped, and even when the rotation of the crank 22 and the rotation of the front wheel 16 or the rotation of the rear wheel 18 are rotating in synchronism, when the rotation of the crank 22 is stopped, the synchronization between the rotation of the crank 22 and the rotation of the front wheel 16 or the rotation of the rear wheel 18 becomes out of sync. By adding the number of times that this type of situation occurs in the determination, the accuracy of the determination on whether or not the detection target of the first sensor 52 and the detection target of the second sensor 60 are the same rotating body is improved.

Third Embodiment

The assist device 40 of the third embodiment will be described, with reference to FIGS. 12 and 13. The configurations that are common to the first embodiment are given the same codes as the first embodiment, and the descriptions thereof will be omitted.

Figure 12:
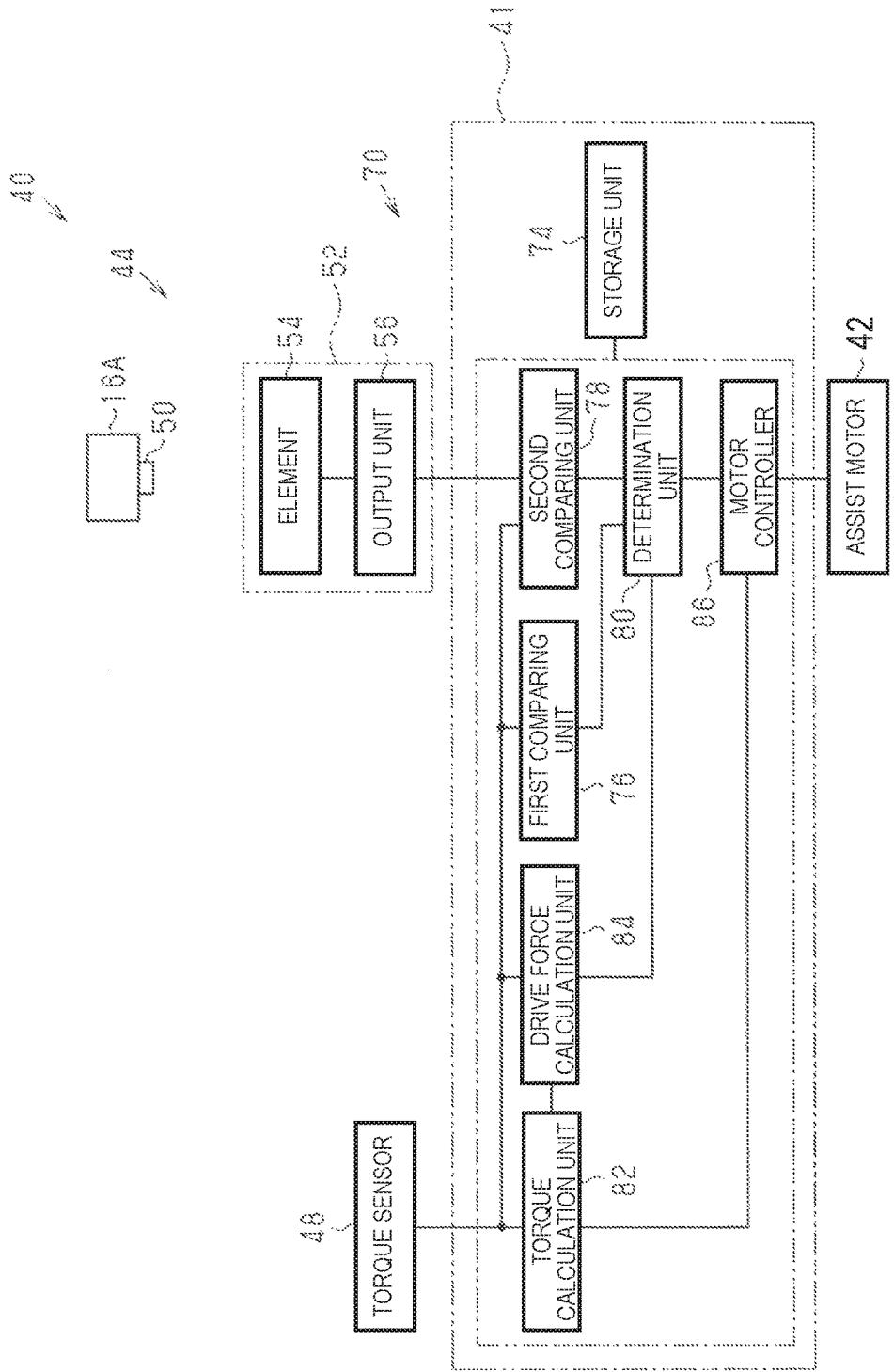
FIG. 12 is a block view of the assist device in accordance with the second embodiment.

As shown in FIG. 12, the assist device 40 omits the second detection device 46. The controller 72 detects the rotational speed of the crank 22 using the output of the torque sensor 48, which outputs a signal corresponding to the manual drive force that is inputted to the crank 22. That is, in the third embodiment, the torque sensor 48 is the second sensor.

The second comparing unit 78 compares the period of a signal that is outputted by the first sensor 52 and the period of a signal that is outputted by the second sensor 60.

Specifically, the second comparing unit 78 calculates the period in which the crank 22 makes one rotational period, based on the output value of the second sensor 60 at the timing at which the first signal S1 is outputted from the first sensor 52. When the second comparing unit 78 the crank 22 is at the top dead center and at the top dead center, the torque τ becomes the minimum, and when the crank 22 is in an intermediate position between the top dead center and the top dead center, the torque τ becomes the maximum. Accordingly the rotational period of the crank 22 can be calculated when looking at the output value of the second sensor 60. However, since a signal corresponding to each of the left and right crank arms 34 is outputted from the second sensor 60 when the crank 22 makes one rotation, the waveform of the torque τ has two peaks when the crank 22 makes one rotation. The controller 72 can process a waveform having two peaks as one set. The controller 72 estimates the period TC of one rotation of the crank 22 based on the waveform of the torque τ.

For example, the second comparing unit 78 sets the output value of the torque sensor 48 at the top dead center and the bottom dead center of the crank 22 as 0, sets the maximum output value of the torque sensor 48 between the top and the bottom dead center of the crank 22 as 100, and calculates the output value of the torque sensor 48 at the timing at which the first signal S1 is outputted as % (hereinafter referred to as "ratio of the output value PX"). The second comparing unit 78 determines whether or not the difference ΔF between the previous and the current ratio of the output value PX of the torque sensor 48 is within a first prescribed range ΔFX. By calculating the ratio of the output value PX of the torque sensor 48, the rotational period of the crank 22 can be obtained even if the manual drive force is changed. The ratio of the output value PX of the torque sensor 48 corresponds to the crank rotational angle CA; therefore the ratio of the output value of the torque sensor can be converted to the crank rotational angle CA as well.

The second comparing unit 78 can calculate the period of the signal that is outputted by the second sensor 60, based on the time at which the previous and the current ratios of the output value PX of the torque sensor 48 become equal. In this case, whether or not the difference ΔF between the period of the signal that is outputted by the first sensor 52 and the period of the signal that is outputted by the second sensor 60 is within the first prescribed range ΔFX, is determined by setting the time at which the previous and the current ratios of the output value PX of the torque sensor 48 become equal as the period of one rotation of the crank 22.

Figure 13:
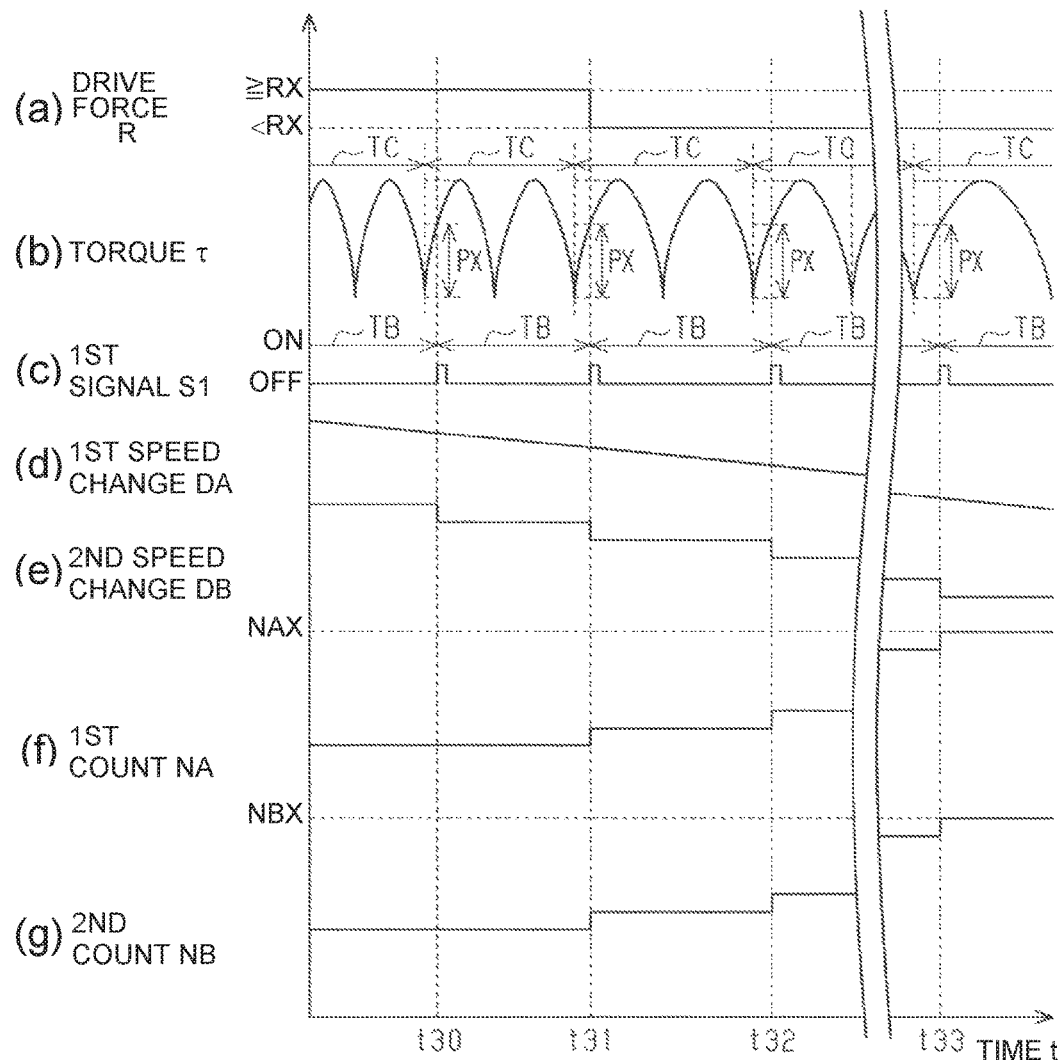
FIG. 13 is a timing chart showing an example of an execution mode of the driving prohibition process of the assist motor in an assist device in accordance with a third embodiment.

The first comparing unit 76 calculates a first speed change DA obtained by differentiating a first rotational speed VA of a rotating body that is calculated based on the first signal S1 that is outputted from the first sensor 52, and a second speed change DB obtained by differentiating a rotational speed of the crank 22 that is calculated from the output waveform of the torque sensor 48, An example of an execution mode of the driving prohibition process of the assist motor 42 will be described, with reference to FIG. 13. Time t31 indicates the time when the bicycle 10 is decelerating and the drive force R has become less than the prescribed value RX. At this time, the controller 72 compares the current ratio of the output value PX of the torque sensor 48 of when the first signal S1 is detected, and the previous ratio of the output value PX of the torque sensor 48 of when the first signal S1 is detected (time t30 in FIG. 13). The controller 72 counts up the first count NA, based on a determination that the difference ΔF is within the first prescribed range ΔFX.

Further, the controller 72 compares the difference ΔD between the first speed change DA and the second speed change DB. The controller 72 counts up the second count NB based on the difference ΔD between the first speed change DA and the second speed change DB being within the second prescribed range ΔDX.

Time t32 indicates the time when the first signal S1 is detected again. At this time, the controller 72 compares the current ratio of the output value PX of the torque sensor 48 of when the first signal S1 is detected, and the previous ratio of the output value PX of the torque sensor 48 of when the first signal S1 is detected (time t31 in FIG. 13). The controller 72 counts up the first count NA, based on a determination that the difference ΔF is within the first prescribed range ΔFX.

Further, the controller 72 compares the difference ΔD between the first speed change DA and the second speed change DB. The controller 72 counts up the second count NB based on the difference ΔD between the first speed change DA and the second speed change DB being within the second prescribed range ΔDX.

Time t33 indicates the time when the first signal S1 is detected again, after a prescribed duration from time t12. At this time, the controller 72 compares the current ratio of the output value PX of the torque sensor 48 of when the first signal S1 is detected, and the previous ratio of the output value PX of the torque sensor 48 of when the first signal S1 is detected. The controller 72 counts up the first count NA, based on a determination that the difference ΔF is within the first prescribed range ΔFX.

Further, the controller 72 compares the difference ΔD between the first speed change DA and the second speed change DB. The controller 72 counts up the second count NB based on the difference ΔD between the first speed change DA and the second speed change DB being within the second prescribed range ΔDX. As a result, the first count NA becomes greater than or equal to the first value NAX, and the second count NB becomes greater than or equal to the second value NBX. The controller 72 sets a prohibition of the driving of the assist motor 42. Meanwhile, in the assist device 40, the configuration of the second sensor 60 shown in the first and the second embodiments can be omitted.

Fourth Embodiment

Figure 14:
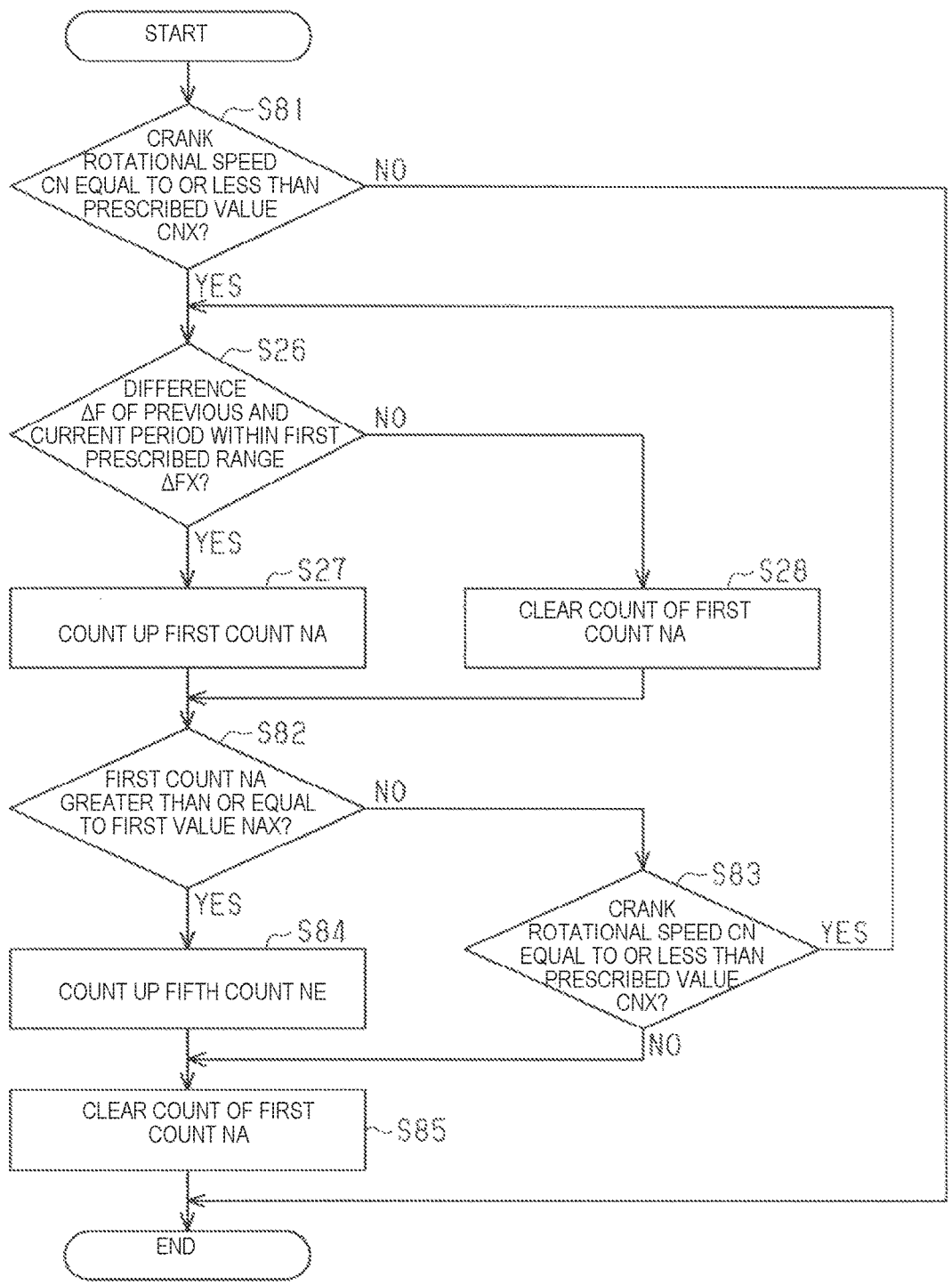
FIG. 14 is a flowchart of a first comparison process that is executed by the controller of the control apparatus in accordance with a fourth embodiment.
Figure 15:
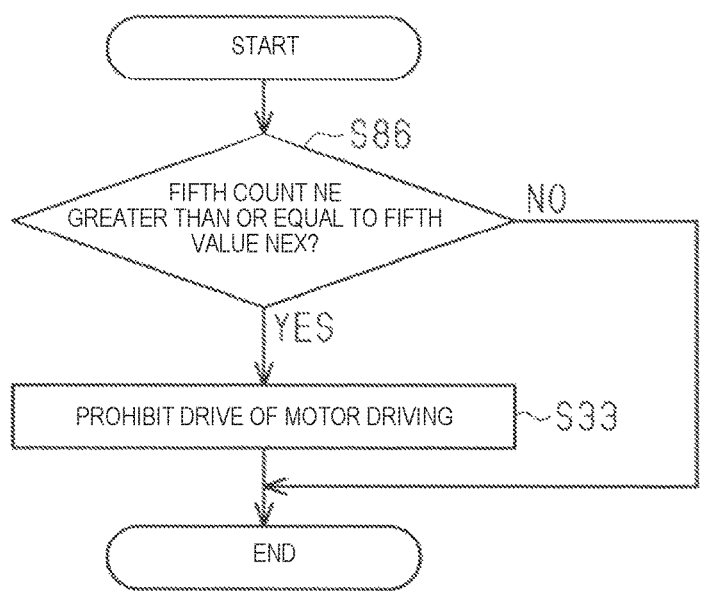
FIG. 15 is a flowchart of a driving prohibition process of the assist motor that is executed by the controller of the control apparatus in accordance with the fourth embodiment.

The control apparatus 70 of the fourth embodiment will be described, with reference to FIGS. 14 and 15. The control apparatus 70 of the fourth embodiment executes the first comparison process shown in FIG. 14, instead of the first comparison process shown in FIG. 4 of the first embodiment. The control apparatus 70 of the fourth embodiment executes the driving prohibition process of the assist motor 42 shown in FIG. 15, instead of the driving prohibition process of the assist motor 42 of FIG. 5 of the first embodiment. The configurations that are common to the first embodiment are given the same codes as the first embodiment, and the descriptions thereof will be omitted.

The first comparison process that is executed by the controller 72 is described with reference to FIG. 14. Meanwhile, the present process is started when power is supplied to the control apparatus 70, or when an operation mode in which the assist motor 42 is drivable is selected. After the present process is temporarily ended, the process are repeated from Step S81 again every prescribed period, until the supply of power to the control apparatus 70 is stopped, or, when an operation mode in which the assist motor 42 is not driven is selected.

In Step S81, the controller 72 determines whether or not the rotational speed CN of the crank 22 in the forward rotational direction has become equal to or less than a prescribed value CNX from a value exceeding the prescribed value CNX. Specifically, the controller 72 determines whether or not the second rotational speed VB has become equal to or less than a prescribed rotational speed VBX from a speed that is greater than the prescribed rotational speed VBX, based on an output of the second sensor 60. The prescribed rotational speed VBX is selected to be a value in the range of, for example, 3 rpm-10 rpm. When the rotational speed CN of the crank 22 in the forward rotational direction is not determined to have become equal to or less than the prescribed value CNX from a value exceeding the prescribed value CNX, the controller 72 ends the present process. When the rotational speed CN of the crank 22 in the forward rotational direction is determined to have become equal to or less than the prescribed value CNX from a value exceeding the prescribed value CNX, the controller 72 proceeds to Step S26. When the rotational speed CN of the crank 22 in the forward rotational direction is greater than or equal to the prescribed value CNX, that is, when the rotational speed CN of the crank 22 in the forward rotational direction is not maintained at a value exceeding the prescribed value CNX, the controller 72 repeats Step S81 and does not proceed to Step S26 until the rotational speed CN of the crank 22 in the forward rotational direction become less than or equal to the prescribed value CNX.

When the difference ΔF is within the first prescribed range ΔFX in Step S26, the controller 72 counts up the first count NA in Step S27, and proceeds to Step S82. When the difference ΔF is not within the first prescribed range ΔFX in Step S26, the controller 72 clears the count of the first count NA in Step S28, and proceeds to Step S82.

In Step S82, the controller 72 determines whether or not the first count NA is greater than or equal to a first value NAX. When the first count NA is less than the first value NAX, the controller 72 proceeds to Step S83.

The controller 72 determines whether or not the rotational speed CN of the crank 22 in the forward rotational direction is equal to or less than the prescribed value CNX, in Step S83. When the rotational speed CN of the crank 22 in the forward rotational direction is equal to or less than the prescribed value CNX in Step S83, the controller 72 proceeds to Step S26. When the rotational speed CN of the crank 22 in the forward rotational direction is not equal to or less than the prescribed value CNX in Step S83, the controller 72 proceeds to Step S85. The first value NAX is set in advance, but can be changeable. For example, the first value NAX stored in the storage unit 74 can be changed by connecting an external computer to the controller 72. When the rotational speed CN of the crank 22 in the forward rotational direction is not equal to or less than the prescribed value CNX in Step S83, the controller 72 can end the process.

When the first count NA is greater than or equal to the first value NAX in Step S82, the controller 72 proceeds to Step S84, counts up a fifth count NE, and further clears the count of the first count NA in Step S85, and ends the present process.

The driving prohibition process of the assist motor 42 will be described with reference to FIG. 15. Meanwhile, the present process is started when power is supplied to the control apparatus 70, or the assist motor 42 is driven. After the present process is temporarily ended, the process are repeated from Step S86 again every prescribed period, until the supply of power to the control apparatus 70 is stopped, or, when the driving of the assist motor 42 is stopped.

In Step S86, the controller 72 determines whether or not the fifth count NE is greater than or equal to a fifth value NEX. When the fifth count NE is less than the fifth value NEX, the controller 72 ends the present process. On the other hand, when the fifth count NE is greater than or equal to the fifth value NEX, the controller 72 prohibits the driving of the assist motor 42 in Step S33 and ends the present process. The fifth value NEX is set in advance, but can be changeable. For example, the fifth value NEX stored in the storage unit 74 can be changed by connecting an external computer to the controller 72. Meanwhile, the fifth value NEX can be set to a value that is greater than or equal to "1." In the series of steps in which the crank 22 transitions from a rotational state to a stopped state, the fifth count NE is only counted up by one when the first count NA becomes greater than or equal to the first value NAX By setting the specified number of times of the fifth count NE to two or more, it is possible to more accurately determine whether or not the detection target of the first sensor 52 and the detection target of the second sensor 60 are the same rotating body.

Modifications

The specific form that the present assist device can take is not limited to the forms illustrated in the above-described embodiments. The present assist device can take various forms different from the assist devices described above. The modified examples of the above-described embodiments shown below are examples of the various forms that the present assist device can take.

Figure 16:
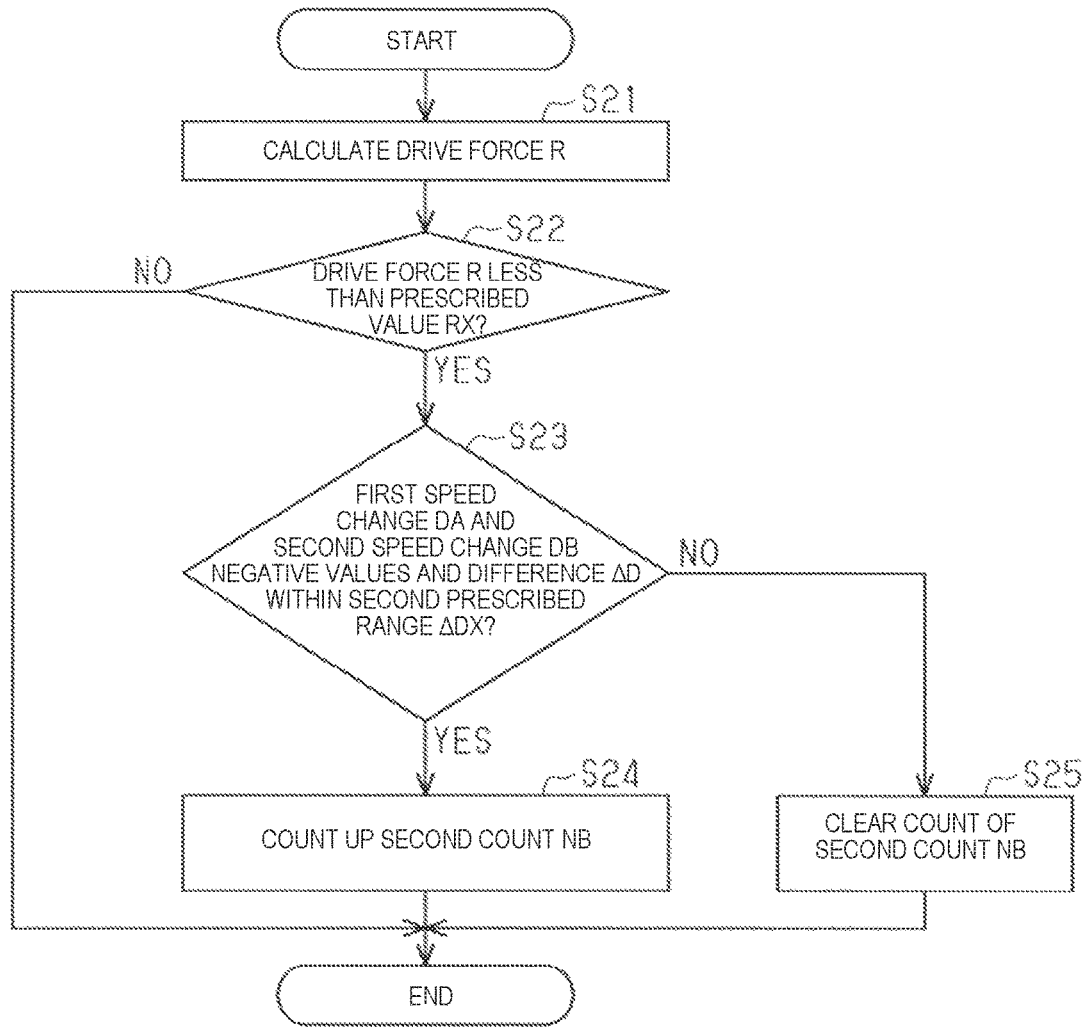
FIG. 16 is a flowchart of the first comparison process of a first modified example in accordance with the first embodiment.
Figure 17:
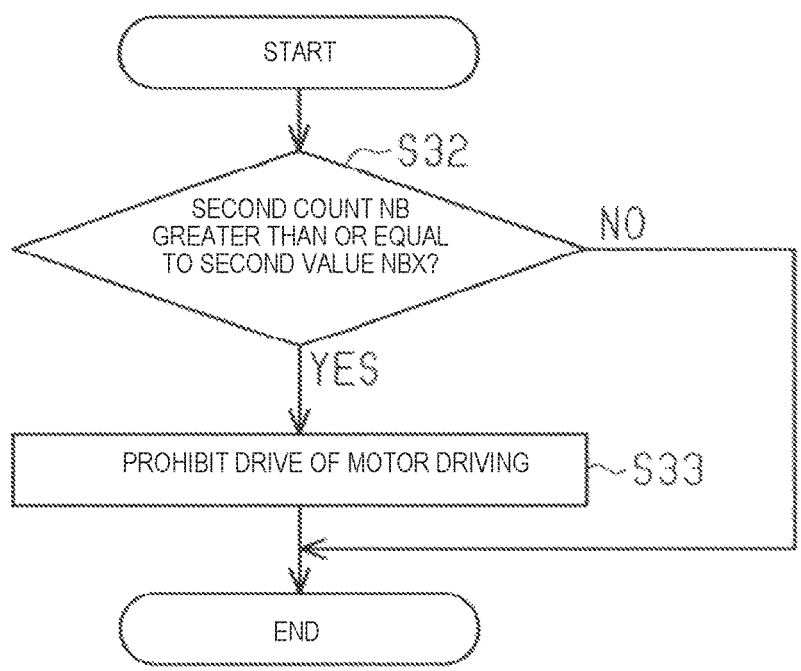
FIG. 17 is a flowchart of the driving prohibition process of the assist motor of the first modified example in accordance with the first embodiment.

In the first comparison process of the first embodiment, the process of Steps S26-S28 can be omitted, as shown in FIG. 16. In this case, Step S31 is omitted from the driving prohibition process of the assist motor 42, as shown in FIG. 17. That is, when the number of times that the difference ΔD between the first speed change DA of when the first rotational speed VA is reduced and the second speed change DB of when the second rotational speed VB is reduced becomes within a second prescribed range ΔDX becomes greater than or equal to a second value NBX, the detection target of the first sensor 52 and the detection target of the second sensor 60 are determined to be the same rotating body. When the number of times that the difference ΔD becomes within the second prescribed range ΔDX becomes greater than or equal to the second value NBX, the controller 72 prohibits the driving of the assist motor 42.

Figure 18:
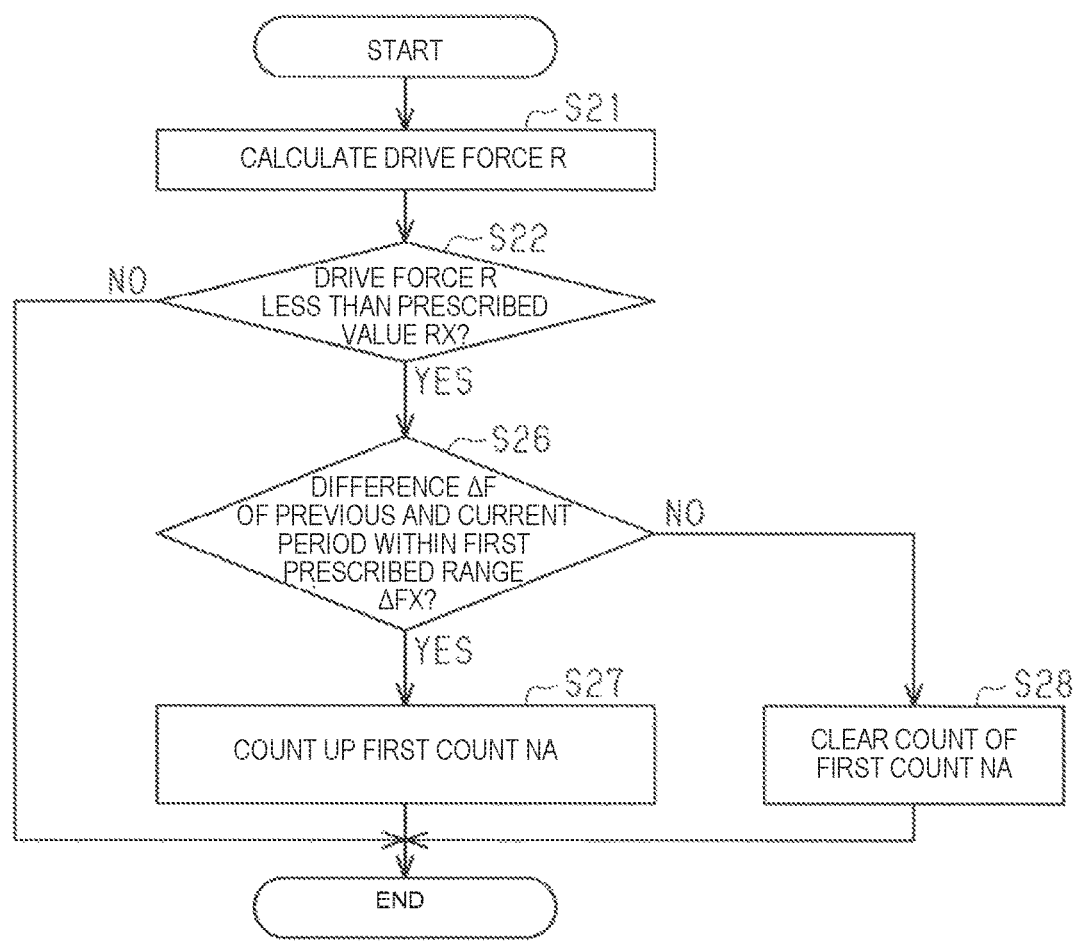
FIG. 18 is a flowchart of the first comparison process of a second modified example in accordance with the first embodiment.
Figure 19:
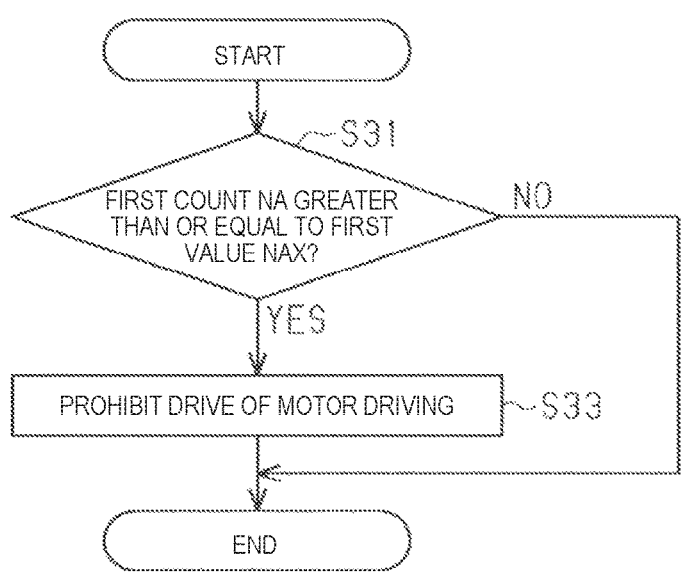
FIG. 19 is a flowchart of the driving prohibition process of the assist motor of the second modified example in accordance with the first embodiment.

In the first comparison process of the first embodiment, the process of Steps S23-S25 can be omitted, as shown in FIG. 18. In this case, Step S32 is omitted from the driving prohibition process of the assist motor 42, as shown in FIG. 19. That is, when the number of times that the phase difference ΔF becomes within a first prescribed range ΔFX becomes greater than or equal to a first value NAX, the controller 72 determines that the detection target of the first sensor 52 and of the second sensor is the same rotating body. When the number of times that the difference ΔD, the phase difference ΔF becomes within the first prescribed range ΔFX becomes greater than or equal to the first value NAX, the controller 72 prohibits the driving of the assist motor 42.

Figure 20:
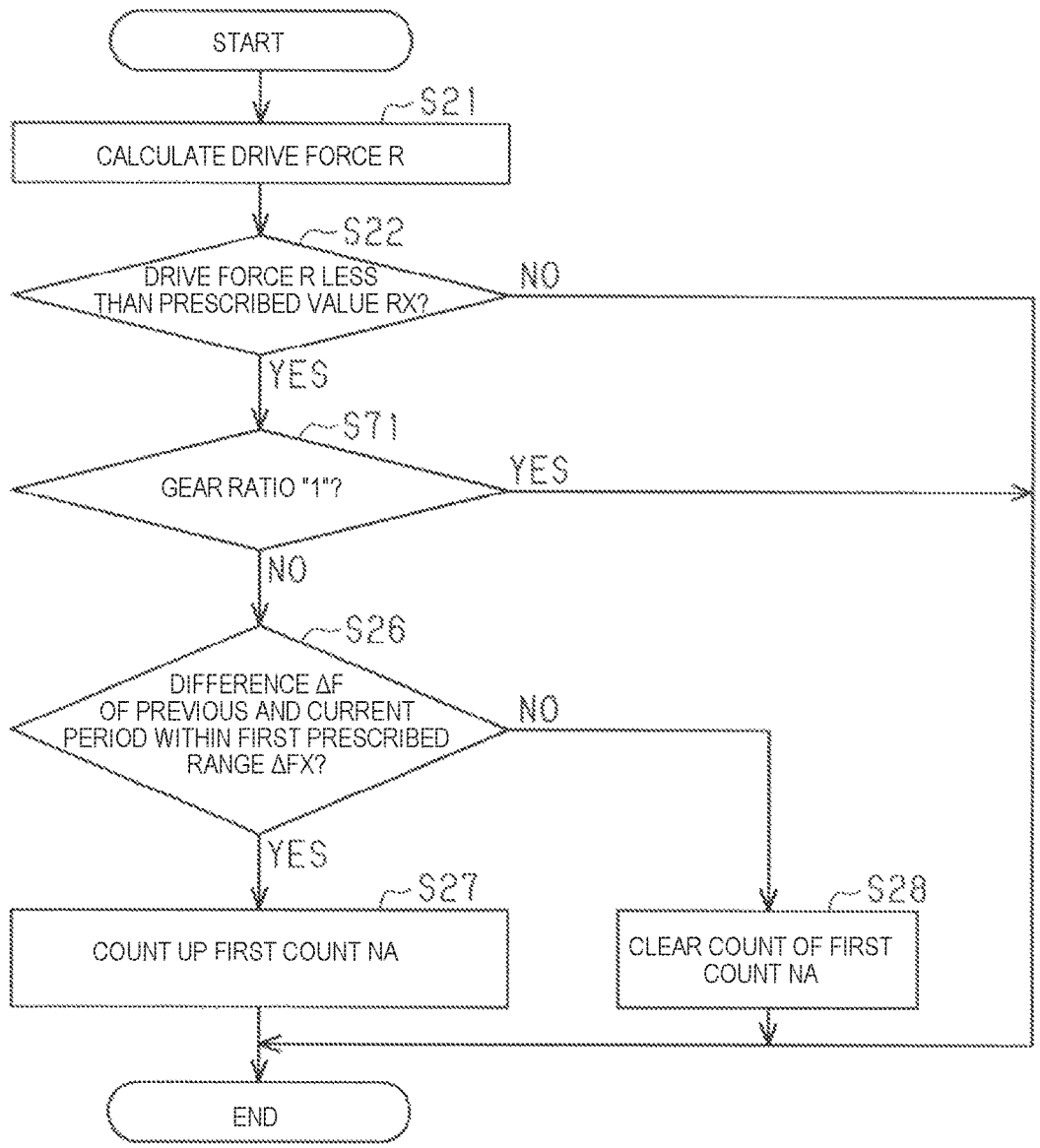
FIG. 20 is a flowchart of the first comparison process of a third modified example in accordance with the first embodiment.

The following process can be added to the first comparison process shown in FIG. 18. As shown in FIG. 20, when the drive force R is greater than or equal to the prescribed value RX in Step S21, the process proceed to Step S71, and it is determined whether or not the gear ratio of the bicycle 10 is "1". When the gear ratio is "1," the controller 72 does not proceed to Step S26 and ends the present process. On the other hand, when the gear ratio is other than "1," the controller 72 proceeds to Step S26, and determines whether or not the phase difference ΔF is within the first prescribed range ΔFX. In this modified example, in a bicycle 10 equipped with an electric transmission, the controller 72 is able to determine the gear ratio by storing a control signal to the actuator of the transmission. Further, a sensor for detecting the gear changing state of the transmission can be provided, and the gear ratio can be determined based on an output of this sensor as well.

It is also possible to determine whether or not the gear ratio of the bicycle 10 is an integer multiple, in Step S71 of the modified example shown in FIG. 18. When the gear ratio is an integer multiple, the controller 72 does not proceed to Step S26 and ends the present process. On the other hand, when the gear ratio is other than an integer multiple, the controller 72 proceeds to step S26, and determines whether or not the phase difference ΔF is within a first prescribed range ΔFX.

The determination step of Step S26 of the first comparison process of the first embodiment can be changed as follows. That is, it is determined whether or not the detection target of the first sensor 52 and the detection target of the second sensor 60 are the same rotating body, based on the difference between the period of a signal that is outputted by the first sensor 52 and the period of a signal that is outputted by the second sensor 60. Specifically, the controller 72 calculates the duration from the current timing to the previous timing at which the first signal S1 is outputted from the first sensor 52 shown in FIG. 8, as the period TB of the first sensor 52. Next, the controller 72 calculates the duration from the crank rotational angle CA of when the first signal S1 is outputted from the first sensor 52 to the previous crank rotational angle CA as the period TA of the second sensor. The controller 72 compares the period TA of the second sensor and the period TB of the first sensor. When the difference ΔT between the period TA of the second sensor and the period TB of the first sensor is within a second prescribed range ΔTX, the controller 72 counts up the second count NB in Step S27. When the difference ΔT between the period TA of the second sensor and the period TB of the first sensor is not within the second prescribed range ΔTX, the controller 72 counts up the second count NB in Step S28. When the second comparing unit 78 compares the periods using signals that are outputted by the element 54 and the element 62A, the controller 72 can determine whether or not the difference between the period with which the first signal S1 was outputted from the first sensor 52 and the period with which the second signal S2 was outputted from the second sensor 60 is within a prescribed range, in step S26. When comparing the periods using signals that are outputted by the element 54 and the element 62B, the controller 72 can calculate the period of one rotation of the crank 22 based on the signal that is outputted by the element 62B.

Figure 21:
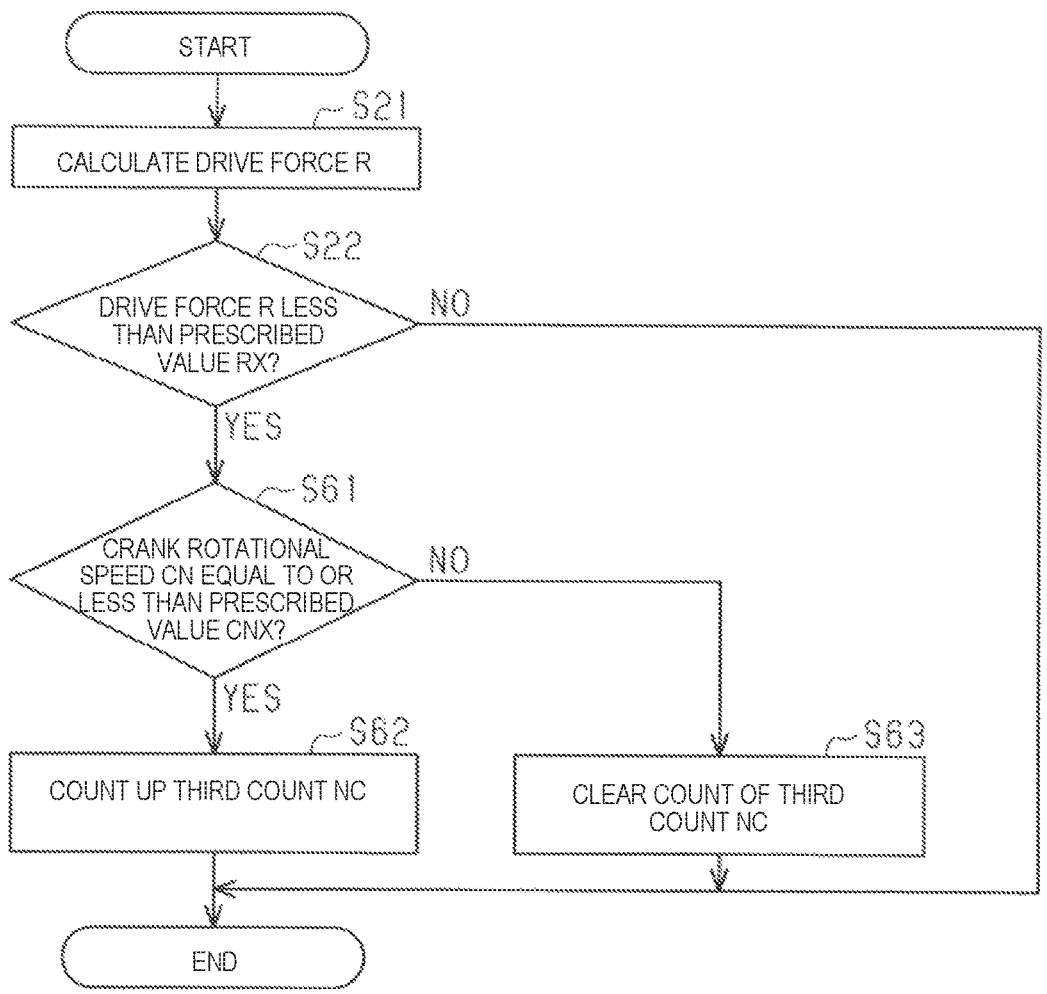
FIG. 21 is a flowchart of the first comparison process of a first modified example in accordance with the third embodiment.
Figure 22:
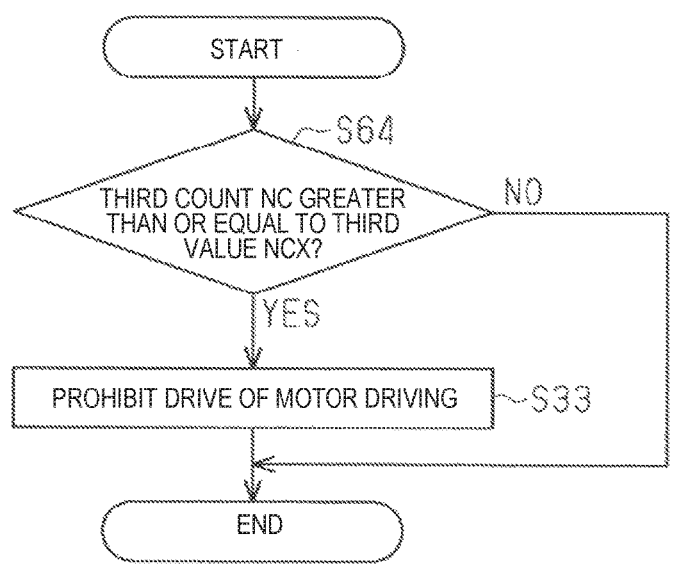
FIG. 22 is a flowchart of the driving prohibition process of the assist motor of the first modified example in accordance with the third embodiment.

In the first comparison process of the second embodiment, the process of Steps S26-S28 can be omitted, as shown in FIG. 21. In this case, Step S31 is omitted from the driving prohibition process of the assist motor 42, as shown in FIG. 22. If zero is selected as the prescribed value CNX, when the number of times that the rotational speed of the rotating body being detected by the first sensor 52 becomes "0," when the rotational speed of the rotating body being detected by the second sensor becomes "0," is greater than or equal to the third value NCX, the controller 72 determines that the detection target of the first sensor 52 and the detection target of the second sensor 60 are the same rotating body. When the third count NC becomes greater than or equal to the third value NCX, the controller 72 prohibits the driving of the assist motor 42.

The second sensor 60 of each embodiment can be changed to a sensor comprising only one of the element 62A or the element 62B.

It is also possible to mount a notification unit that is capable of notifying by text or voice on the bicycle 10 of each embodiment. When the detection target of the first sensor 52 and the detection target of the second sensor 60 are detected to be the same rotating body, the controller 72 notifies by the notification unit.

The driving prohibition process of the assist motor 42 of each embodiment can be omitted. In this case, for example, a detection result that the detection target of the first sensor 52 and the detection target of the second sensor 60 are the same rotating body can be stored in the storage unit 74.

In the first comparison process of the first to the third embodiments, Step S21 and Step S22 can be omitted. In this case, the drive force calculation unit 84 is also omitted.

In the determination process of each embodiment, each step of the determination process can be executed only when the assist motor 42 is being driven. That is, a determination process is not executed when assist is not being carried out by the assist motor 42. A time when assist by the assist motor 42 is not being carried out is, for example, when the assist mode is set to OFF by the rider, or when the assist motor 42 cannot be driven because the voltage of the battery 14 has become low.

In the determination process of each embodiment, each step of the determination process can be executed only when the assist motor 42 is being driven based on the manual drive force. That is, a determination process is not executed when assist is not being carried out by the assist motor 42 based on the manual drive force. A time when assist is not being carried out by the assist motor 42 based on the manual drive force is, for example, when the manual drive force is "0," or, when the driving of the assist motor 42 is stopped due to the bicycle speed V being greater than a prescribed value.

In each embodiment, at least one of the first prescribed range ΔFX, the second prescribed range ΔDX, and the third prescribed range ΔFY can be set to "0." That is, in Step S26 of the first comparison process of the first embodiment, when the difference ΔF between the previous and the current phases is "0," the first count NA is counted up. Further, when the difference ΔD is "0" in Step S23 of the first comparison process of the first embodiment, the second count NB is counted up. Further, in Step S43 of the third comparison process of the first embodiment, when the difference ΔF between the previous and the current phases or periods is "0," the count of the fourth count ND is cleared.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control apparatus comprising:
   a controller configured to determine whether or not a first detection target of a first sensor and a second detection target of a second sensor are the same rotating body based on a first output of a first sensor that reflects a first rotational speed of a first rotating body provided to a bicycle and a second output of a second sensor that reflects a second rotational speed of a second rotating body provided to the bicycle.

2. The bicycle control apparatus as recited in claim 1, wherein
   the controller is configured to permit a driving of an assist motor that provides a manual drive force to the bicycle upon determining the rotational speed of the rotating body being detected by the first sensor is less than a first speed,
   the controller is configured to stop the driving of the assist motor when the rotational speed of the rotating body being detected by the first sensor is greater than or equal to the first speed, and
   the controller is configured to control the assist motor based on a detection result on whether or not the detection target of the first sensor and the detection target of the second sensor are the same rotating body.

3. The bicycle control apparatus as recited in claim 2, wherein
   the controller is configured to prohibit the driving of the assist motor, when the first sensor and the second sensor are determined to be detecting a state of the same rotating body.

4. The bicycle control apparatus as recited in claim 1, wherein
   the controller is configured to determine whether or not the detection target of the first sensor and the detection target of the second sensor are the same rotating body, based on at least one of a phase difference between a phase of a signal that is outputted by the first sensor and a phase of a signal that is outputted by the second sensor, and a period difference between a period of a signal that is outputted by the first sensor and a period of a signal that is outputted by the second sensor.

5. The bicycle control apparatus as recited in claim 4, wherein
   the controller is configured to determine that the detection target of the first sensor and the detection target of the second sensor are the same rotating body, when a number of times that the phase difference or the period difference becomes within a first prescribed range becomes greater than or equal to a first prescribed number of times.

6. The bicycle control apparatus as recited in claim 1, wherein
   the controller is configured to determine whether or not the detection target of the first sensor and the detection target of the second sensor are the same rotating body, based on a speed difference between a change in speed of the rotating body that is being detected by the first sensor when the rotational speed of the rotating body that is being detected by the first sensor is decreasing, and a change in speed of the rotating body that is being detected by the second sensor when the rotational speed of the rotating body that is being detected by the second sensor is decreasing.

7. The bicycle control apparatus as recited in claim 6, wherein
   the controller is configured to determine that the detection target of the first sensor and the detection target of the second sensor are the same rotating body, when a number of times that the speed difference becomes within a second prescribed range becomes greater than or equal to a second prescribed number of times.

8. The bicycle control apparatus as recited in claim 1, wherein
   the controller is configured to determine whether or not the detection target of the first sensor and the detection target of the second sensor are the same rotating body, based on the output of the first sensor and the output of the second sensor, when a driving force of a rider is smaller than a prescribed value.

9. The bicycle control apparatus as recited in claim 1, wherein
   the controller is configured to determine whether or not the detection target of the first sensor and the detection target of the second sensor are the same rotating body, based on the output of the first sensor and the output of the second sensor, when a gear ratio of the bicycle is other than "1".

10. The bicycle control apparatus as recited in claim 4, wherein
- the controller is configured to prohibit the driving of the assist motor, when the first sensor and the second sensor are determined to be detecting a state of the same rotating body, and
- when the driving of the assist motor is being prohibited based on a determination that the detection target of the first sensor and the detection target of the second sensor are the same rotating body, the controller is configured to permit the driving of the assist motor when the detection targets of the first and second sensors are determined not to be the same rotating body, based on the outputs of the first and second sensors.

11. The bicycle control apparatus as recited in claim 10, wherein
- when the driving of the assist motor is being prohibited based on a determination that the detection target of the first sensor and the detection target of the second sensor are the same rotating body, the controller permits the driving of the assist motor, when the number of times that at least one of the phase difference and the period difference does not become within a third prescribed range becomes greater than or equal to a fourth prescribed number of times.

12. A bicycle assist device comprising the bicycle control apparatus as recited in claim 1, and further comprising:
- an assist motor;
- a first sensor configured to detect a rotation of a wheel; and
- a second sensor configured to detect a rotation of one of a crank and a crankshaft.

13. The bicycle assist device recited in claim 12, wherein the second sensor comprises an element configured to detect a magnetic field of a magnet that is provided to the one of the crank and the crankshaft.

14. The bicycle assist device recited in claim 13, wherein the second sensor is configured to output a signal corresponding to a rotational angle of the one of the crank and the crankshaft.

15. The bicycle assist device recited in claim 12, wherein the second sensor is configured to output a signal corresponding to a manual drive force that is inputted to the crank.

16. The bicycle assist device recited in claim 12, wherein the first sensor comprises an element configured to detect a magnetic field of a magnet that is provided to the wheel.

* * * * *